(12) United States Patent
Sulejmani

(10) Patent No.: US 11,127,054 B1
(45) Date of Patent: *Sep. 21, 2021

(54) QUEUE WAIT TIME ESTIMATION

(71) Applicant: Musa Sulejmani, Mahomet, IL (US)

(72) Inventor: Musa Sulejmani, Mahomet, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/867,971

(22) Filed: May 6, 2020

Related U.S. Application Data

(63) Continuation-in-part of application No. 16/556,669, filed on Aug. 30, 2019, now Pat. No. 10,810,636, which is a continuation-in-part of application No. 16/383,922, filed on Apr. 15, 2019, now Pat. No. 10,417,670, which is a continuation of application No. 15/636,051, filed on Jun. 28, 2017, now Pat. No. 10,282,763.

(60) Provisional application No. 62/364,601, filed on Jul. 20, 2016.

(51) Int. Cl.
*G06Q 30/02* (2012.01)
*H04W 4/021* (2018.01)
*H04W 4/02* (2018.01)

(52) U.S. Cl.
CPC ........ *G06Q 30/0281* (2013.01); *H04W 4/021* (2013.01); *H04W 4/026* (2013.01); *H04W 4/027* (2013.01)

(58) Field of Classification Search
CPC .................. G06Q 30/06; H04W 4/23
USPC .............. 709/203; 705/14.64; 455/456.6
See application file for complete search history.

(56) References Cited

U.S. PATENT DOCUMENTS

| | | |
|---|---|---|
| 7,385,516 B2 | 6/2008 | Contractor |
| 8,885,813 B2 | 11/2014 | Vendrow |
| 2010/0063854 A1 | 3/2010 | Purvis |
| 2013/0072230 A1 | 3/2013 | Bansal |
| 2016/0345127 A1* | 11/2016 | DeWitt ................. G06Q 10/02 |
| 2017/9111768 | 4/2017 | Smith |
| 2018/0054796 A1 | 2/2018 | Edge |

* cited by examiner

*Primary Examiner* — Kiet M Doan
(74) *Attorney, Agent, or Firm* — Duane Morris LLP

(57) ABSTRACT

The queue wait time estimation system of the present disclosure leverages its users' Internet-connected mobile devices—and the data they generate based on sensor feedback—to estimate the queue wait times at various establishments. The queue wait time estimation system communicates the estimated queue wait times to the users to enable the users to make an informed decision as to whether they'd like to visit a particular establishment based on its estimated queue wait time.

14 Claims, 6 Drawing Sheets

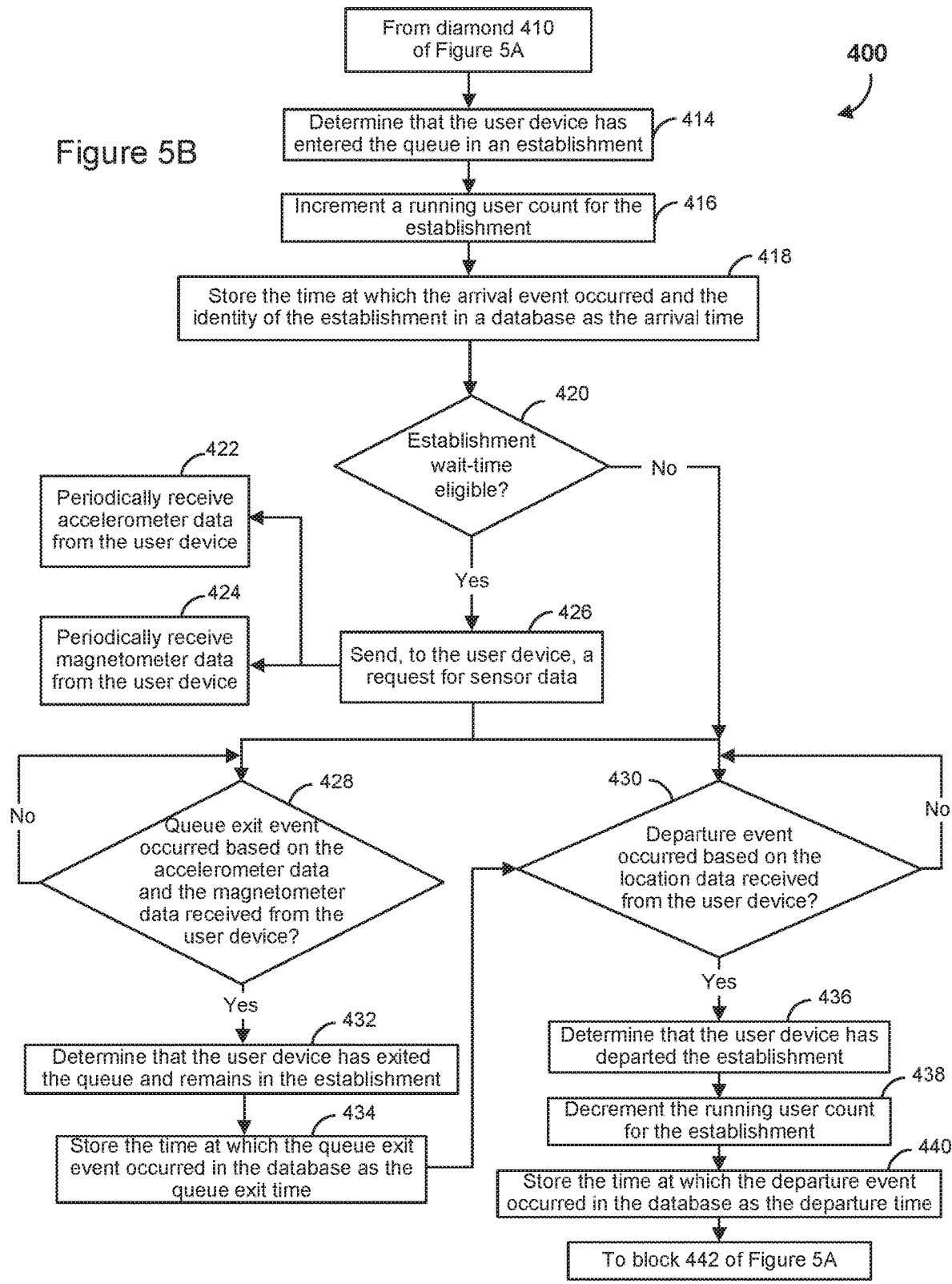

QUEUE WAIT TIME ESTIMATION

PRIORITY CLAIM

The present application is a continuation-in-part of U.S. patent application Ser. No. 16/556,669 to M. Sulejmani (filed on Aug. 30, 2019) which is a continuation-in-part of U.S. patent application Ser. No. 16/383,922 to M. Sulejmani (filed on Apr. 15, 2019), which claims priority to U.S. patent application Ser. No. 15/636,051 to M. Sulejmani (filed on Jun. 28, 2017), which claims priority to U.S. Provisional Patent App. No. 62/364,601 to M. Sulejmani (filed on Jul. 20, 2016). Each of these prior applications are hereby incorporated by reference.

BACKGROUND

People dislike waiting in queues (or lines), be it for their morning coffee or their lunchtime burrito. Free time is especially prized for certain people, and wasting it standing in a queue is frustrating and stressful. For example, someone who undergoes dialysis 10 to 12 hours each day for months at a time can't afford to spend precious free time standing in a queue. With Americans alone spending tens of billions of hours each year waiting in queues, there is a need for new technology that enables people to reduce the amount of time they wait in queues.

SUMMARY

The queue wait time estimation system of the present disclosure leverages its users' Internet-connected mobile devices—and the data they generate based on sensor feedback—to estimate the queue wait times at various establishments. The queue wait time estimation system communicates the estimated queue wait times to the users to enable the users to make an informed decision as to whether they'd like to visit a particular establishment based on its estimated queue wait time. No longer will a user step out for a quick coffee break to unexpectedly find himself stuck in a 20-minute queue for a latte.

In various embodiments, for a given user, the queue wait time estimation system uses: (1) location data (such as global positioning system (GPS) coordinates) from the user's mobile device (such as a smart phone) to determine when the user arrives at an establishment, which the queue wait time estimation system assumes is the time the user enters the queue at the establishment; (2) sensor data obtained from sensors on the user's mobile device (such as accelerometers and a magnetometer) to determine when the user exits the queue; and (3) location data from the user's mobile device to determine when the user departs the establishment. The queue wait time estimation system uses this data to determine the amount of time the user spent waiting in the queue at the establishment, called the queue wait time. The queue wait time estimation system determines queue wait times for numerous users who visit the establishment, and uses some of these individual queue wait times to determine an estimated queue wait time for the establishment that reflects how long a person will likely wait in the queue when visiting the establishment.

In certain embodiments, the queue wait time estimation system also maintains a running count of the quantity of queue wait time estimation system users in each establishment. The queue wait time estimation system uses this running count to estimate a total quantity of people in each establishment.

Responsive to users' requests, the queue wait time estimation system communicates the estimated queue wait time for the establishment (and optionally the estimated total quantity of people in the establishment) to the users, such as via a queue wait time estimation application installed on the users' mobile devices. This enables the users to make informed decisions as to whether to visit the establishment.

Additional features and advantages are described in, and will be apparent from, the following Detailed Description and the Figures.

BRIEF DESCRIPTION OF THE FIGURES

FIGS. 5A and 5B are a flowchart of an example process of operating the queue wait time estimation system of FIG. 1 from the perspective of the server of FIG. 2.

DETAILED DESCRIPTION

The queue wait time estimation system of the present disclosure leverages its users' Internet-connected mobile devices—and the data they generate based on sensor feedback—to estimate the queue wait times at various establishments. The queue wait time estimation system communicates the estimated queue wait times to the users to enable the users to make an informed decision as to whether they'd like to visit a particular establishment based on its estimated queue wait time.

The following numbered headings are included for clarity, and do not limit the scope of the present disclosure.

1. Hardware

Figure 1:
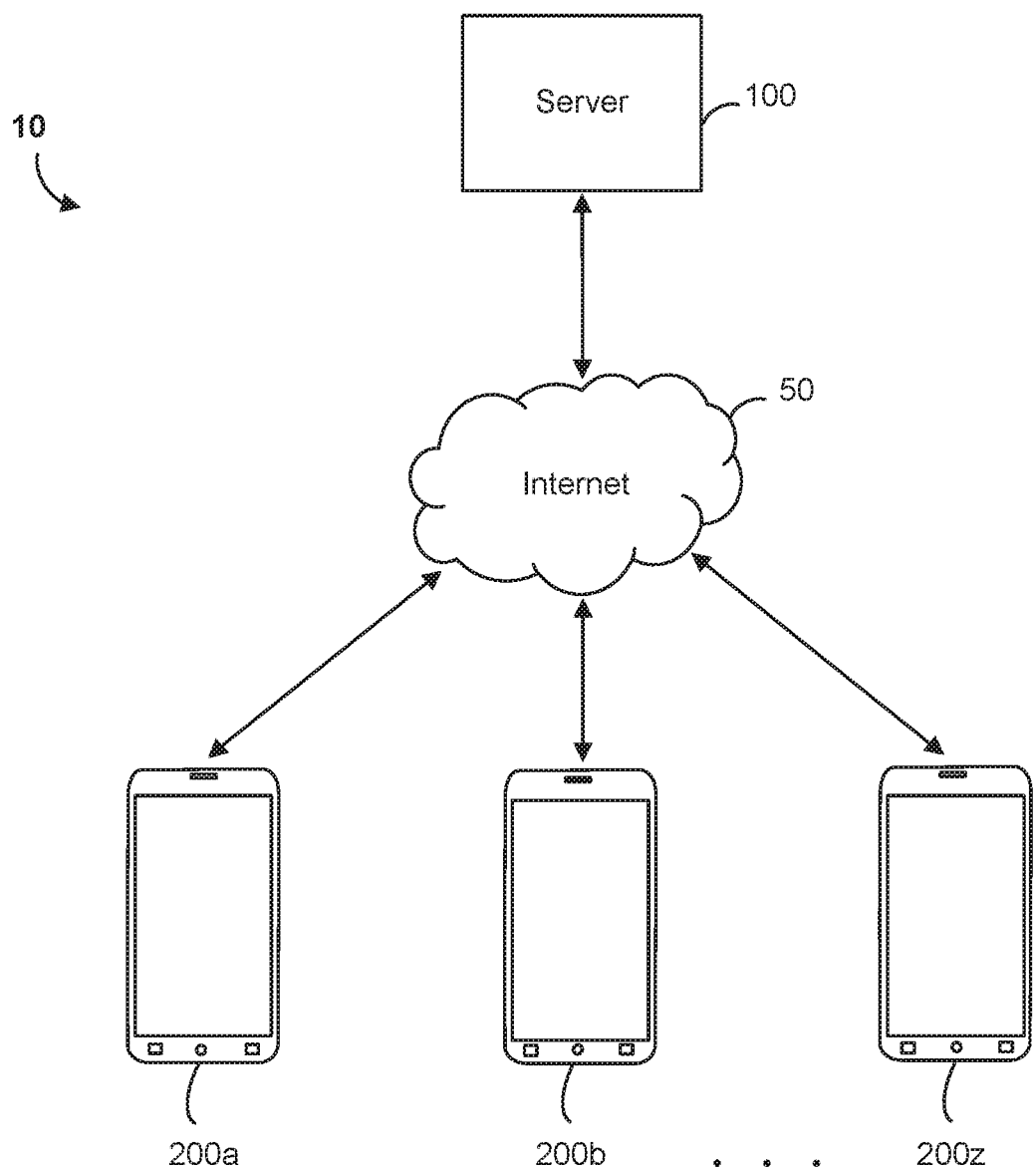
FIG. 1 is a block diagram of one example embodiment of the queue wait time estimation system of the present disclosure.

FIG. 1 shows one example embodiment of the queue wait time estimation system 10 including a server 100 communicatively connectable to a plurality of user devices 200*a*, 200*b*, . . . 200*z* via the Internet 50 (or any other suitable data network). While the server 100 is shown as a single server, the server 100 may comprise multiple servers or other suitable computing devices.

Figure 2:
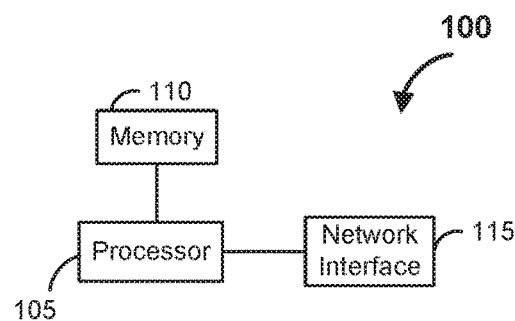
FIG. 2 is a block diagram of one example embodiment of a server of the queue wait time estimation system of FIG. 1.

FIG. 2 is a block diagram of one example embodiment of the server 100, which includes: (1) a server processor 105; (2) a server memory 110; and (3) a server network interface 115.

The server processor 105 is configured to execute program code or instructions stored on the server memory 110 to control operation of the server 100. The server processor 105 may be a general-purpose processor; a content-addressable memory; a digital-signal processor; an application-specific integrated circuit; a field-programmable gate array; any suitable programmable logic device, discrete gate, or transistor logic; discrete hardware components; or any combination of these. The server processor 105 may be a microprocessor, a controller, a microcontroller, or a state machine. It may also be implemented as a combination of computing devices, such as a combination of a digital signal processor and a microprocessor, a plurality of microprocessors, or one or more microprocessors in conjunction with a digital signal processor core.

The server memory 110 is configured to store, maintain, and provide data as needed to support the functionality of the server 100. For instance, in various embodiments, the server memory 110 stores program code or instructions executable by the server processor 105 to control operation of the server 100. The server memory 110 may be any suitable data storage device, such as one or more of: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); and (4) read-only memory.

The server network interface 115 is configured to connect the server 100 to a wireless network—such as the Internet, a local area network, or a cellular network—and to facilitate bidirectional communication between the server 100 and other devices connected to that wireless network.

Figure 3:
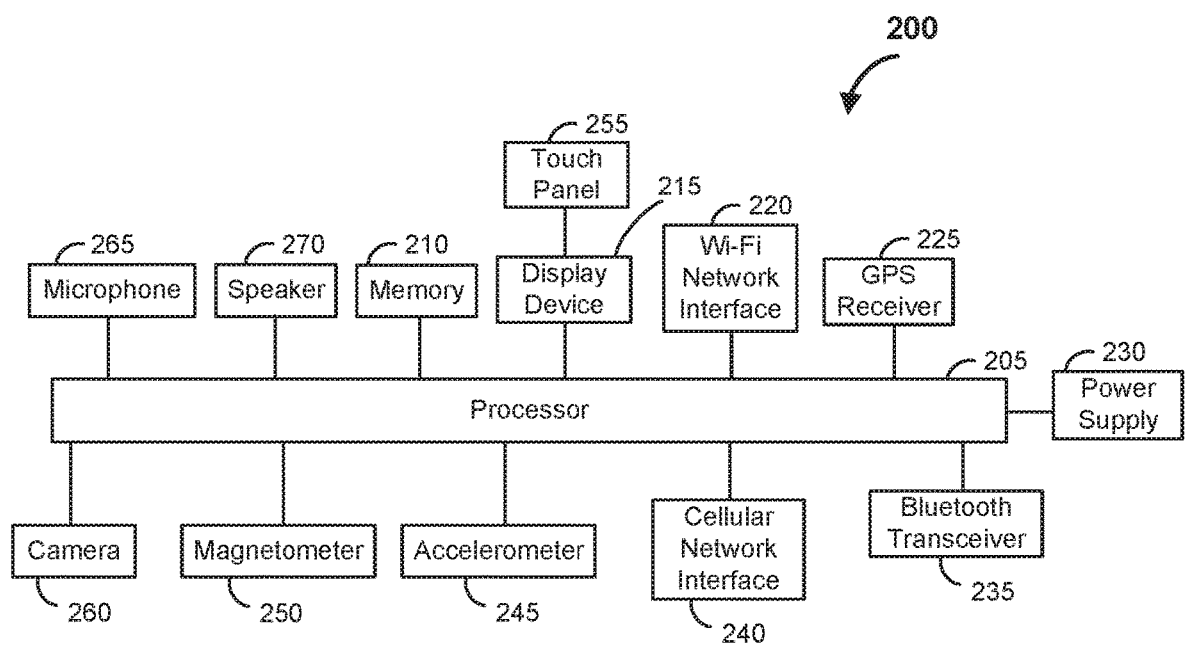
FIG. 3 is a block diagram of one example embodiment of a user device—a mobile phone—of the queue wait time estimation system of FIG. 1.

FIG. 3 is a block diagram of one example embodiment of a user device 200, which is a mobile phone and includes: (1) a user device processor 205; (2) a user device memory 210; (3) a display device 215; (4) a Wi-Fi network interface 220; (5) a GPS receiver 225; (6) a power supply 230; (7) a Bluetooth transceiver 235; (8) a cellular network interface 240; (9) an accelerometer 245; (10) a magnetometer 250; (11) a touch panel 255; (12) a camera 260; (13) a microphone 265; and (14) a speaker 270.

The user device processor 205 is configured to execute program code or instructions stored on the user device memory 210 to control operation of the user device 200. The user device processor 205 may be a general-purpose processor; a content-addressable memory; a digital-signal processor; an application-specific integrated circuit; a field-programmable gate array; any suitable programmable logic device, discrete gate, or transistor logic; discrete hardware components; or any combination of these. The user device processor 205 may be a microprocessor, a controller, a microcontroller, or a state machine. It may also be implemented as a combination of computing devices, such as a combination of a digital signal processor and a microprocessor, a plurality of microprocessors, or one or more microprocessors in conjunction with a digital signal processor core.

The user device memory 210 is configured to store, maintain, and provide data as needed to support the functionality of the user device 200. For instance, in various embodiments, the user device memory 210 stores program code or instructions executable by the user device processor 205 to control the user device 200. The user device memory 210 may be any suitable data storage device, such as one or more of: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); and (4) read-only memory.

The display device 215 is configured to display images and video responsive to signals received from the user device processor 205. In various embodiments, the display device includes, without limitation: a liquid—crystal display, a display based on light-emitting diodes (LEDs), a display based on a plurality of organic LEDs, a display based on polymer LEDs, a display based on a plurality of surface-conduction electron emitters, a display including a projected or reflected image, a plasma display, or any other suitable display mechanism.

The touch panel 255 enables a user to provide different inputs to the user device 200. The touch panel 255 is overlaid atop the display device 215 and enables a user to provide various inputs to the user device 200 by performing any of a variety of different touch operations (e.g., touching and releasing the touch panel, swiping the touch panel, and double tapping the touch panel) with her finger or a compatible stylus, depending on the embodiment. The touch panel 255 is configured to send the coordinate data of the detected location of the input touch operation to the user device processor 205, which is configured to control the user device 200 to perform an operation responsive to the received touch input. In this example embodiment, the touch panel 255 is a capacitive touch panel, though the user device 200 may include any suitable type of touch panel (such as a resistive touch panel).

The Wi-Fi network interface 220 is configured to connect the user device 200 to a wireless network—such as the Internet or a local area network—and to facilitate bidirectional communication between the user device 200 and other devices connected to that wireless network.

The GPS receiver 225 is configured to acquire geolocation data from one or more remote sources (such as one or more GPS satellites) and to send that geolocation data to the user device processor 205. The user device processor 205 is configured to use the geolocation data to determine information relating to the absolute position of the user device 200 on the Earth or a relative position of the user device 200 on the Earth as compared to another absolute position on the Earth (such as the absolute position of a restaurant the user wants to visit).

The power supply 230 includes a battery, such as a lithium-polymer battery, a lithium-ion battery, a nickel-metal-hydride battery, a nickel-cadmium battery, or any other suitable rechargeable or non-rechargeable power supply sufficient to power the components of the user device 200.

The Bluetooth transceiver 235 is configured to wirelessly pair the user device 200 to another Bluetooth-enabled device and to facilitate bidirectional communication between the user device 200 and the other Bluetooth-enabled device.

The cellular network interface 240 is configured to connect the user device 200 to a cellular network and to facilitate bidirectional communication between the user device 200 and other devices connected to the cellular network.

The accelerometer 245 is configured to detect acceleration data of the user device 200 on two or three axes and to transmit the acceleration data to the user device processor 205. The user device processor 205 is configured to use the acceleration data to determine the motion and orientation of the user device 200.

The magnetometer 250 is configured to measure the Earth's magnetic field, determine the direction of the Earth's magnetic North, and transmit data representing the direction of the Earth's magnetic North to the user device processor 205. The user device processor 205 is configured to use the GPS coordinates of the mobile phone and a global map of declination angle (the angle between the Earth's true North and the Earth's magnetic North) to determine a required correction angle. The user device processor 205 is configured to apply the required correction angle to the direction of the Earth's magnetic North to obtain the direction of the Earth's true North. The magnetometer 250 thus enables digital compass functionality on the user device 200.

The camera 260 is any suitable camera configured to capture still images or video, which are stored in the user device memory 210.

The microphone 265 and the speaker 270 are suitable devices respectively configured to receive and output sound, and may interface with suitable analog-to-digital and digital-to-analog converters.

2. Operation 2.1 User Device/Server Interaction—User Device Perspective

Figure 4:
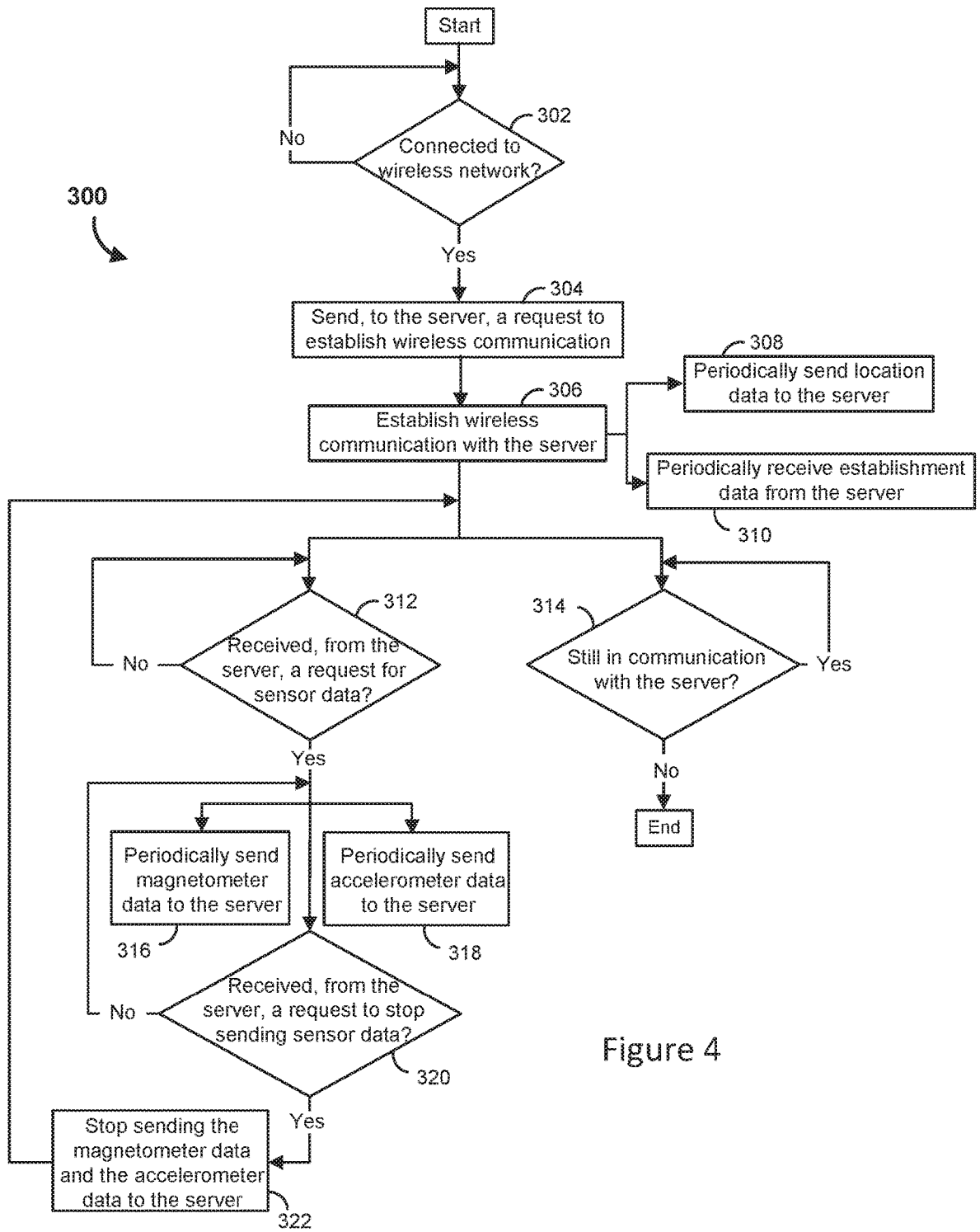
FIG. 4 is a flowchart of an example process of operating the queue wait time estimation system of FIG. 1 from the perspective of the user device of FIG. 3.

FIG. 4 is a flowchart of an example process 300 of operating the queue wait time estimation system 10 from the perspective of the user device 200. In various embodiments, a set of instructions stored in the user device memory 210 and executed by the user device processor 205 represents the process 300. Although the process 300 is described with reference to the flowchart shown in FIG. 4, many other processes of performing the acts associated with this illustrated process 300 may be employed. For example, the order of certain of the illustrated blocks or diamonds may be changed, certain of the illustrated blocks or diamonds may be optional, or certain of the illustrated blocks or diamonds may not be employed.

In this example embodiment, a queue wait time estimation application must be installed on the user device 200—such as on the user device memory 210—before the user device 200 can communicate with the server 100 as described below. The queue wait time estimation application enables communication between the server 100 and the user device 200, which enables the user device 200 to display (or otherwise output) establishment data received from the server 100 for one or more establishments. Establishment data includes, for a particular establishment: (1) an estimated queue wait time (available if the establishment is queue-wait-time eligible); and/or (2) an estimated total quantity of patrons currently in the establishment (available in certain embodiments).

The process 300 begins with the user device 200 monitoring for connection to a suitable wireless network—such as the Internet or a cellular network—over which the user device 200 can communicate with the server 100, as diamond 302 indicates. In this example embodiment, the user device 200 is configured to communicate with the server 100 whenever the user device 200 is connected to a network that facilitates communication with the server 100. That is, in this embodiment, the queue wait time estimation application need not be open on the user device 200 for the user device 200 to communicate with and send data to the server 100, as described below. Rather, in this embodiment, the queue wait time estimation application requires the user to agree to enable the user device 200 to communicate with and send data to the server 100 in the background while the user device 200 is connected to a suitable network, regardless of whether the queue wait time estimation application is open on the user device 200.

Responsive to connecting to a suitable wireless network at diamond 302, the user device 200 sends, to the server 100 and via one of the network interfaces 220 and 240, a request to establish wireless communication, as block 304 indicates. The user device 200 establishes wireless communication with the server 100, as block 306 indicates.

Afterward, the user device 200: (1) periodically sends, to the server 100 and via one of the network interfaces 220 and 240, location data, as block 308 indicates; and (2) periodically receives, from the server 100 and via one of the network interfaces 220 and 240, establishment data, as block 310 indicates. The user device 200 may send the location data to the server 100 at any suitable points in time, such as (but not limited to) responsive to new or updated location data being received or determined by the user device 200, at particular time intervals, or according to a predetermined schedule. Periodically as used herein is therefore not limited to regular intervals, and can encompass irregularly-spaced points in time. In this example embodiment, the location data includes the absolute position on Earth of the user device 200 that the user device processor 205 determines based on geolocation data the GPS receiver 225 receives. The location data may include, for instance, the GPS coordinates of the user device 200. The location data may also include a timestamp representing the time at which the user device 200 sends the location data to the server 100. The user device 200 may periodically receive the establishment data from the server 100 at any suitable points in time, such as (but not limited to) responsive to a user-input request for establishment data, responsive to the queue wait time estimation system application opening on the user device 200, responsive to the server 100 updating the establishment data, at particular time intervals, or according to a predetermined schedule.

In this embodiment, the user device 200 periodically sends the location data and periodically receives the establishment data until ceasing wireless communication with the server 100. This enables the server 100 to continuously monitor the location of the user device 200 to determine when an arrival event or a departure event occurs to indicate a user has arrived at or departed from an establishment, as described below with respect to FIGS. 5A and 5B.

Additionally, after the user device 200 establishes wireless communication with the server 100, the user device 200 monitors: (1) for receipt, from the server 100 and via one of the network interfaces 220 and 240, of a request for sensor data, as diamond 312 indicates; and (2) the status of the wireless communication with the server 200, as diamond 314 indicates.

Responsive to receiving, from the server 100 and via one of the network interfaces 220 and 240, a request for sensor data, the user device 200 periodically sends to the server 100 and via one of the network interfaces 220 and 240: (1) magnetometer data the magnetometer 250 obtains, as block 316 indicates; and (2) accelerometer data the accelerometer 245 obtains, as block 318 indicates. The periodic sending may occur at any suitable points in time, such as (but not limited to) responsive to new or updated sensor data being received or determined, at particular time intervals, or according to a predetermined schedule. The magnetometer data may include the direction in which the user device 200 is pointing relative to the Earth's true North, which the user device processor 205 determines based on the direction of the Earth's magnetic North sensed by the magnetometer 250. The accelerometer data may include raw acceleration data detected by the accelerometer 245, which the server 100 processes, or already processed raw acceleration data, such as an estimated quantity of steps the user has taken since the last data transmission (or during a suitable time period).

The user device 200 also monitors for receipt, from the server 100 and via one of the network interfaces 220 and 240, of a request to stop sending the sensor data, as diamond 320 indicates. The user device 200 periodically sends the magnetometer data and the accelerometer data to the server 100 until receiving a request to stop sending the sensor data or until ceasing wireless communication with the server 100. This enables the server 100 to continuously monitor this sensor data to determine when a queue exit event occurs to indicate the user has exited the queue and is idle at an establishment, as described below with respect to FIGS. 5A and 5B.

Responsive to receiving a request to stop sending the sensor data at diamond 312, the user device 200 stops sending the magnetometer data and the accelerometer data to the server 100, as block 322 indicates. The user device 200 again begins monitoring for receipt, from the server 100 and via one of the network interfaces 220 and 240, of a request for sensor data, as diamond 312 indicates (as well as continuing to monitor the status of the wireless communication with the server 100, as diamond 314 indicates).

Responsive to determining that the user device 200 is no longer in communication with the server 100 at diamond 314, the process 300 ends. The user device 200 and the server 100 may lose communication for a variety of reasons, such as either or both of their network interfaces shutting down. In certain embodiments, if the user device 200 and the server 100 lose the ability to communicate with one another (such as before the user device 200 receives the request to stop sending the sensor data), the user device 200 continues to collect the sensor data and locally stores the sensor data until communication is reestablished with the server 100. At that point, the user device 200 sends the collected and locally stored sensor data to the server 100.

2.2 User Device/Server Interaction—Server Perspective

Figure 5A:
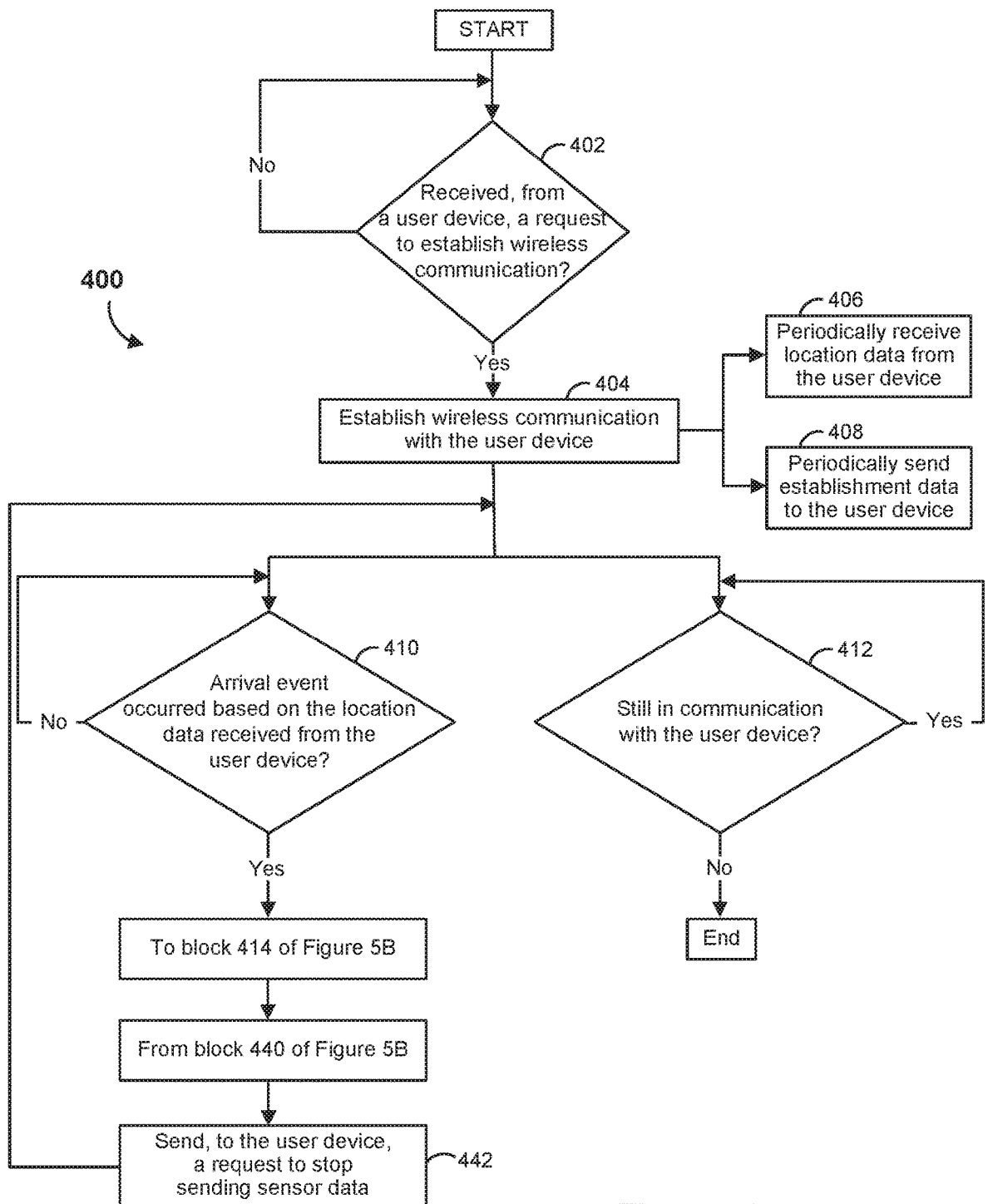

FIGS. 5A and 5B are (collectively) a flowchart of an example process 400 of operating the queue wait time estimation system 10 from the perspective of the server 100. In various embodiments, a set of instructions stored in the server memory 110 and executed by the server processor 105 represents the process 400. Although the process 400 is described with reference to the flowchart shown in FIGS. 5A and 5B, many other processes of performing the acts associated with this illustrated process 400 may be employed. For example, the order of certain of the illustrated blocks or diamonds may be changed, certain of the illustrated blocks or diamonds may be optional, or certain of the illustrated blocks or diamonds may not be employed.

The process 400 is explained below for a single user device, though the server is configured to simultaneously perform process 400 for hundreds, thousands, tens of thousands, or hundreds of thousands of user devices in an overlapping manner.

The process 400 begins with the server 100 monitoring for receipt, from the user device 200 and via the network interface 115, of a request to establish wireless communication with the user device 200, as diamond 402 indicates. Responsive to receiving a request to establish wireless communication, the server 100 establishes wireless communication with the user device 200, as block 404 indicates.

Afterward, the server 100: (1) periodically receives, from the user device 200 and via the network interface 115, location data, as block 406 indicates; and (2) periodically sends, to the user device 200 and via the network interface 115, establishment data, as block 408 indicates. The location data and the establishment data are described above.

The server 100 periodically receives the location data and periodically sends the establishment data until ceasing wireless communication with the user device 200, as described above. This enables the server 100 to continuously monitor the location of the user device 200 to determine when an arrival event or a departure event occurs to indicate a user has arrived at or departed from an establishment, as described below.

Additionally, after the server 100 establishes wireless communication with the user device 200, the server 100 monitors: (1) for the occurrence of an arrival event based on the location data received from the user device 200, as diamond 410 indicates; and (2) the status of the wireless communication with the user device 200, as diamond 412 indicates.

An occurrence of an arrival event indicates to the server 200 that the user (with her user device 200) has arrived at an establishment. In this example embodiment, the arrival event occurs when the location data received from the user device 200 indicates that the user device 200 has been located within a designated vicinity of an establishment for a designated period of time. Specifically, in this example embodiment, the server 100 periodically or continuously cross-references the GPS coordinates of the user device 200 with an establishment database that stores the GPS coordinates of the epicenter (or any other portion) of each of multiple establishments. The server 100 determines that the arrival event occurs when the GPS coordinates of the user device 200 have been within the designated vicinity of the GPS coordinates of the epicenter of one of the establishments for the designated period. For instance, the server 100 determines that the arrival event occurs for Restaurant A when the GPS coordinates of the user device 200 have been within a 30 foot radius of the GPS coordinates of the epicenter of Restaurant A for 10 seconds.

The designated vicinity may be defined in any suitable manner, such as by any suitably shaped area (e.g., a circular area, a rectangular area, or an oval area), and the designated vicinity may take any suitable size(s). Different establishments may have different designated vicinities. For instance, in one example embodiment, a 10,000 square foot gym has a larger designated vicinity than a 750 square foot coffee shop.

The designated period may be any suitable period of time. The designated period is large enough to ensure that the server 100 is receiving accurate location data from the user device 200 to weed out false positives. For instance, GPS is at times inaccurate, so the designated period provides a buffer against the server 100 receiving inaccurate GPS coordinates and determining that the user device 200 is in an establishment when in reality it's not. Different establishments may have different designated periods.

Returning to the process 400, responsive to determining that the arrival event occurred for a particular establishment at diamond 410, the server 100 determines that the user (and her user device 200) has entered the queue in the establishment, as block 414 indicates. That is, the server 100 assumes the user entered the queue at the establishment upon arriving at the establishment. The server 100 increments a running queue wait time estimation system user count for the establishment that is stored in a database (such as on the server memory 110), as block 416 indicates. As described below, the server 100 uses the running queue wait time estimation system user count for a particular establishment to estimate how many patrons are inside the establishment at a given point in time. The server 100 also stores the time at which the arrival event occurred (such as by storing a timestamp received from the user device 200) and the identity of the establishment (such as an address of the establishment or the GPS coordinates of the establishment) in a database (such as one stored on the server memory 110) as the arrival time, as block 418 indicates.

The server 100 determines whether the establishment is queue-wait-time eligible, as diamond 420 indicates. The server 100 is configured to determine estimated queue wait times for queue-wait-time eligible establishments, but is not configured to determine estimated queue wait times for establishments that are not queue-wait-time eligible. Queue-wait-time eligible establishments include establishments for which the queue wait time estimation system can estimate the amount of time people will be waiting (such as in a queue) for a service. In this example embodiment, the server 100 determines whether the establishment is queue-wait-time eligible by referencing the establishment database, which includes an entry for each establishment that indicates whether the establishment is queue-wait-time eligible. In other embodiments, all establishments are queue-wait-time eligible, and the server 100 does not perform step 420.

Responsive to determining that the establishment is not queue-wait-time eligible at diamond 420, the process 400 proceeds to diamond 430, described below. That is, if the establishment is not queue-wait-time eligible, the server 100 does not monitor for the occurrence of the queue exit event, but instead monitors for the occurrence of the departure event.

On the other hand, responsive to determining that the establishment is queue-wait-time eligible at diamond 420, the server 100 sends, to the user device 200 and via the network interface 115, a request for sensor data, as block 426 indicates. Responsive to sending the request for sensor data, the server 100 periodically receives, from the user device 200 and via the network interface 115: (1) accelerometer data, as block 422 indicates; and (2) magnetometer data, as block 424 indicates. The accelerometer data and the magnetometer data are described above. In other embodiments, the server 100 requests and receives any other suitable data collected from any sensor(s) of the user device 200 or determined based on data collected from any sensor(s) of the user device 200.

After sending the request for sensor data, the server 100 monitors for: (1) an occurrence of a queue exit event based on the accelerometer data and the magnetometer data received from the user device 200, as diamond 428 indicates; and (2) an occurrence of the departure event based on the location data received from the user device 200, as diamond 430 indicates.

An occurrence of the queue exit event indicates to the server 200 that the user (with her user device 200) has exited the queue and remains in the establishment (e.g., is idly sitting in the establishment). In this example embodiment, the queue exit event occurs when the following two triggering events occur within a particular time period: (1) the accelerometer data indicates that the user has taken fewer than a designated quantity of steps within a first designated time period; and (2) the magnetometer data indicates that the direction in which the user device 200 is pointing has not changed more than a designated amount within a second designated time period. The particular time period during which the two triggering events must occur for the queue exit event to occur may be any suitable time period. The first and second designated time periods may be of any suitable length, may be the same or different, may completely overlap, may partially overlap, or may not overlap, depending on the embodiment. The designated quantity of steps may be any suitable quantity of steps. For example, the queue exit event occurs when: (1) the accelerometer data indicates the user has taken fewer than 2 steps within a 60 second time period; and (2) the magnetometer data indicates that the user device 200 has been pointed within the same a 5 degree range (or any other suitable range) during that same 60 second time period.

Responsive to determining that the queue exit event occurred at diamond 428, the server 100 determines that the user (and her user device 200) has exited the queue and remains in the establishment, as block 432 indicates. The server 100 stores the time at which the queue exit event occurred in a database (such as one stored on the server memory 110) as the queue exit time, as block 434 indicates.

Following an occurrence of the queue exit event at diamond 428, the server 100 monitors for an occurrence of the departure event based on the location data received form the user device 200, as diamond 430 indicates.

An occurrence of the departure event indicates to the server 100 that the user (with her user device 200) has departed the establishment. In this example embodiment, the departure event occurs when the location data received from the user device 200 indicates that the user device 200 has been located outside of the designated vicinity of the establishment for a designated period. For example, the departure event occurs for Restaurant A when the GPS coordinates of the user device 200 have been outside of a 30 foot radius of the GPS coordinates of the epicenter of Restaurant A for 180 seconds.

The designated vicinity may be defined in any suitable manner, such as by any suitably shaped area (e.g., a circular area, a rectangular area, or an oval area), and the designated vicinity may take any suitable size(s). Different establishments may have different designated vicinities. For instance, in one example embodiment, a 10,000 square foot gym has a larger designated vicinity than a 750 square foot coffee shop. The designated vicinity for the departure event may be the same as or different from the designated vicinity for the arrival event.

The designated period of time may be any suitable period. The designated period is large enough to ensure that the server 100 is receiving accurate location data from the user device 200 to weed out false positives. For instance, GPS is at times inaccurate, so the designated period provides a buffer against the server 100 receiving inaccurate GPS coordinates and determining that the user device 200 is in an establishment when in reality it's not. Different establishments may have different designated periods. The designated period for the departure event may be the same as or different from the designated period for the arrival event.

In this example embodiment, since the departure event is based on location data and not sensor data, large fluctuations in the sensor data that occur after the queue exit event—such as those that would occur when a patron is walking to the soda fountain to get a refill—do not trigger the departure event and therefore do not affect the estimated queue wait time of the establishment.

Returning to the process 400, responsive to determining that the departure event occurred for a particular establishment at diamond 430, the server 100 determines that the user (and her user device 200) has departed the establishment, as block 436 indicates. The server 100 decrements the running queue wait time estimation system user count (explained above) for the establishment, as block 438 indicates. The server 100 also stores the time at which the departure event occurred (such as by storing a timestamp received from the user device 200) in a database (such as one stored on the server memory 110) as the departure time, as block 440 indicates. Additionally, the server 100 sends, to the user device 200 and via the network interface 115, a request to stop sending sensor data, as block 442 indicates.

At this point, the user device again begins monitoring for an occurrence of the arrival event (as well as continuing to monitor the status of the wireless communication with the user device 200, as diamond 412 indicates). Responsive to determining that the server 100 is no longer in communication with the user device 200 at diamond 412, the process 400 ends.

2.3 Determining Establishment Data

The server 100 uses the data gathered during the process 400 for multiple user devices 200 to determine two types of establishment data for an establishment: (1) an estimated queue wait time (if applicable); and (2) an estimated total quantity of patrons in the establishment (if applicable).

2.3.1 Determining Estimated Queue Wait Time

For each occurrence of the arrival event and subsequent departure event for each establishment—called a "wait event"—the server 100 is configured to use the arrival time, the departure time, and (if applicable) the queue exit time to determine a queue wait time. The queue wait time is a period of time that represents the (estimated) amount of time the user spent waiting in the queue at that establishment for that particular wait event.

For wait events in which the queue exit event occurred, the server 100 determines the queue wait time by determining the difference between the arrival time and the queue exit time. This reflects, for example, situations in which the user remains in the establishment after receiving a service (e.g., sits down to eat after ordering and receiving her food at a fast-food restaurant). The server 100 stores the determined queue wait time in a suitable database.

Here's an example. Evelyn powers on her mobile phone, on which the queue wait time estimation application is installed. The mobile phone establishes wireless communication with the server. Evelyn grabs her backpack and heads to class. As Evelyn walks to class, her mobile phone periodically sends the mobile phone's GPS coordinates to the server. The server monitors the mobile phone's GPS coordinates and references them against an establishment database.

Evelyn decides to stop for coffee at Coffee Shop C before class. Evelyn walks inside and gets in the queue. After 10 seconds pass, the server determines that the arrival event occurred because the GPS coordinates of Evelyn's mobile phone have been within a 30 foot radius of the GPS coordinates of the epicenter of Coffee Shop C for 10 seconds. The server determines an arrival time of 9:00 a.m. Evelyn's mobile phone begins sending accelerometer data and magnetometer data to the server, and the server monitors this data.

Evelyn orders her coffee, picks it up, and decides to sit down and catch up on some reading. She places her mobile phone on the table. After 60 seconds pass, the server determines that the queue exit event occurred because: (1) Evelyn hasn't taken any steps in 60 seconds; and (2) Evelyn's mobile phone has been pointing in the same direction for the same 60 seconds. The server determines a queue exit time of 9:06 a.m.

Evelyn finishes up and leaves Coffee Shop C. After 10 seconds pass, the server determines that the departure event occurred because the GPS coordinates of Evelyn's mobile phone have been outside of a 30 foot radius of the GPS coordinates of the epicenter of Coffee Shop C for 10 seconds. This completes the wait event. The server determines a departure time of 9:20 a.m. In this example, the queue wait time is 6 minutes (the difference between the arrival time (9:00 a.m.) and the queue exit time (9:06 a.m.)). Evelyn spent a total of 20 minutes in Coffee Shop C (the difference between the arrival time (9:00 a.m.) and the departure time (9:20 a.m.)).

For wait events in which the queue exit event did not occur, the server 100 determines the queue wait time by determining the difference between the arrival time and the departure time. This reflects, for example, situations in which the user does not remain in the establishment after receiving a service (e.g., takes her food to go after ordering and receiving her food at a fast-food restaurant). The server 100 stores the determined queue wait time in a suitable database in association with the establishment.

For example, assume that Evelyn (from the above example) decided not to sit in Coffee Shop C, but to leave immediately after picking up her coffee. After 10 seconds pass, the server determines that the departure event occurred because Evelyn's mobile phone has been outside a 30 foot radius of the GPS coordinates of the epicenter of Coffee Shop C for 10 seconds. This completes the wait event. The server determines a departure time of 9:06 a.m. In this example, the queue wait time is 6 minutes (the difference between the arrival time (9:00 a.m.) and the departure time (9:06 a.m.)). Evelyn spent a total of 6 minutes in Coffee Shop C (the difference between the arrival time (9:00 a.m.) and the departure time (9:06 a.m.)).

As the server 100 determines and stores individual queue wait times for wait events at a given establishment, the server 100 uses those queue wait times to determine the real-time or nearly real-time estimated queue wait time for that establishment. The server 100 periodically updates the estimated queue wait time for each establishment to ensure accuracy (such as at regular intervals, according to a predetermined schedule, or whenever another wait event occurs for an establishment), and stores the updated estimated queue wait time in association with that establishment in a suitable database. When the server 100 receives a request for the estimated queue wait time from a user device 200 for a particular establishment, the server 100 determines the estimated queue wait time by referencing the establishment in the database and sends the estimated queue wait time to the user device 200 for display. This means that an estimated queue wait time sent to a user is a real-time or nearly real-time value. This provides the user an accurate estimate of the time the user will be waiting in line should the user visit the establishment shortly after viewing the estimated queue wait time.

The queue wait time system may also determine, store, and send to users average estimated queue wait times for different periods of time. For instance, for a particular establishment, the queue wait time system may determine and store average estimated queue wait times for each hour of the day and/or for each day of the week. This enables users to plan ahead and determine what the estimated queue wait time will be at a particular time on a particular day.

In certain embodiments, the estimated queue wait time for an establishment for a particular period of time is equal to the mean of the individual wait times for the wait events for that establishment that occur within that block of time. For instance, if 7 wait events have occurred between 1:00 p.m. and 2:00 p.m. and the queue wait times for those wait events were 6 minutes, 5 minutes, 7 minutes, 8 minutes, 9 minutes, 5 minutes, and 4 minutes, the queue wait time estimation system would determine an estimated queue wait time of about 6.3 minutes. In some embodiments, the estimated queue wait time includes a range. In one such embodiment, the queue wait time estimation system determines the lower end of the range by subtracting one (or any suitable quantity of) standard deviation from the mean and determines the upper end of the range by adding one (or any suitable quantity of) standard deviation to the mean. In the above example, the standard deviation of about 1.8, so the estimated queue wait time range is 4.5 minutes to 8.1 minutes.

In other embodiments, the estimated queue wait time for an establishment is equal to the rolling mean of the queue wait times of a designated quantity of the most recent wait events for that establishment. For instance, if the designated quantity is three and the queue wait times for the three most recent wait events are 9 minutes, 5 minutes, and 4 minutes, the queue wait time estimation system would determine an estimated queue wait time of 6 minutes.

In other embodiments, the server 100 uses queuing theory to determine the estimated queue wait time for an establishment for a given time period. In one example embodiment, the server 100 first determines: (1) an arrival rate, which represents the quantity of arrival events that occurred during the time period (determined based on location data received from the user devices); and (2) a service rate, which represents the quantity of queue exit events that occurred during the time period (determined based on sensor data received from the user devices). The server 100 uses Equations 1 to 5 below to determine the estimated queue wait time for the establishment. In these equations: (1) μ represents the arrival rate (units of people per hour); (2) λ represents the service rate (units of people per hour); (3) r represents the utilization rate and has (no units); (4) $P_0$ represents the probability that the system is idle (i.e., that no one is being served or in line) (no units); (5) L represents the expected number of people being served and/or in line; (6) $L_q$ represents the expected quantity of people in the queue; and (7) $W_q$ represents the estimated queue wait time for a new arrival in the queue.

$$r = \lambda/\mu \quad (1)$$

$$P_0 = (1-r) \quad (2)$$

$$L = \lambda/(\mu-\lambda) \quad (3)$$

$$L_q = \lambda^2/(\mu(\mu-\lambda)) \quad (4)$$

$$W_q = L_q/\lambda \quad (5)$$

Here's an example. Assume the arrival rate μ is 5 and the service rate λ is 4 for a particular time period. In this example: (1) r=0.8; (2) $P_0$=0.2; (3) L=4; (4) $L_q$=3.2; and (5) $W_q$=0.8 hours.

The system in the above example assumes a Poisson process applies (which means the rate of arrival is not cyclical but random, but the system mathematically models it so it is cyclical).

The queue wait time estimation system may use any other suitable manner(s) of data manipulation to determine the estimated queue wait time for an establishment based on the determined individual queue wait times, such as (but not limited to) exponential smoothing, time series analyses such as the Box-Jenkins approach, X-11, and other casual models such as regression models and econometrical models.

In various embodiments, the queue wait time estimation system uses inference and signal processing techniques applied to mobile pedometer and accelerometer data. It attempts to infer and aggregate these statistics across venues with different traffic patterns and for users of different behavioral patterns. It relies on a low-pass filter applied to discretized pedometer data streams, followed by pattern matching against common prototypes of customer movement in establishments. This method is robust to noise and scales easily in both the dimensions of user and venue entries.

2.3.2 Determining the Estimated Total Quantity of Patrons in an Establishment

As explained above, as arrival and departure events occur for an establishment, the server 100 increments and decrements the running queue wait time estimation system user count for the establishment. But since in some instances all patrons of the establishment may not use the queue wait time estimation system, the running queue wait time estimation system user count may not accurately reflect the actual total quantity of patrons in the establishment.

To solve this problem, the server 100 uses a confidence interval population calculation to determine the estimated total quantity of patrons in the establishment based on the running queue wait time estimation system user count for that establishment.

2.3.3 Determining Estimated Queue Wait Time—Alternative Embodiments

In addition to, or in place of, using accelerometer and magnetometer data from sensors provided by a smartphone or any mobile device, other sensors such as pedometers and/or gyroscopes can also assist in the detection and calculation of wait times using smartphone data. These embodiments are not limited to pedometers and gyroscopes, as they may utilize any device that can detect or analyze movement, location, or motion in general (e.g., inertial sensors, micro-electrical mechanical systems (MEMS), etc.) These sensors are pertinent in that they can assist in detecting when a user's device has become immobile, thus leading to the detection of a queue exit event.

Figure 6A:
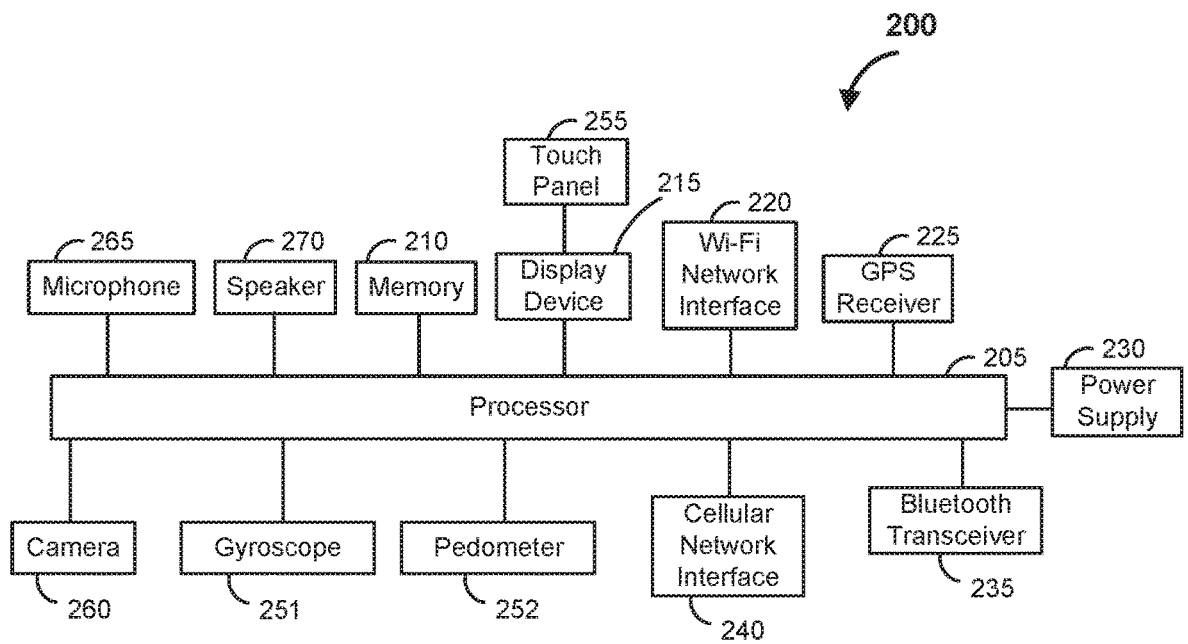
FIGS. 6A and 6B are each a block diagram of another example embodiment of a user device—a mobile phone—of the queue wait time estimation system of FIG. 1.

FIG. 6A is a block diagram of another example embodiment of a user device 200, as described above with respect to FIG. 3, where the magnetometer 250 is replaced with a gyroscope 251 and the accelerometer 245 is replaced with a pedometer 252. All the other elements in FIG. 6A are as described above in FIG. 3. It is also contemplated by the present disclosure that either the gyroscope 251 or the pedometer 252 may be optional.

Figure 6B:
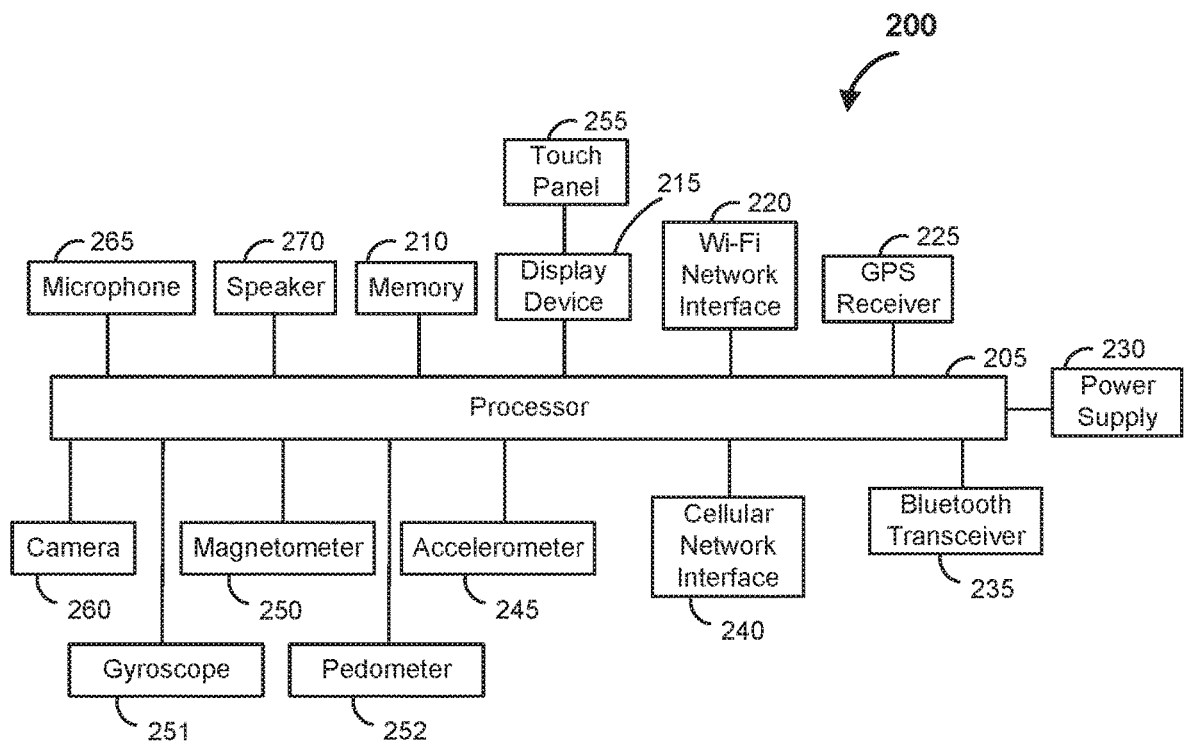

FIG. 6B is a block diagram of yet another example embodiment of a user device 200, as described above with respect to FIG. 3, where the gyroscope 251 and the pedometer 252 are in addition to the magnetometer 250 and the accelerometer 245. All the other elements in FIG. 6B are as described above in FIG. 3. It is also contemplated by the present disclosure that either the gyroscope 251 or the pedometer 252 may be optional.

Pedometers and gyroscopes are sensors which may be found in a smartphone. These sensors may also be found in devices in their own embedded systems as well. Pedometers may be used to track footsteps (e.g., when a user is walking), whether the pedometer is electronic or mechanical. The pedometer needs to be sensitive enough to be able to track small steps. The sensitivity is important to the queue exit event because, in certain embodiments, there is a need to be able to track a user's steps during short periods of immobility to increase the accuracy of calculated/determined wait times. The pedometer may take its sensed input and convert the input into bits of information that may be stored in the device, and from there the data may be made accessible from an API or SDK from the device's codebase.

In the queue wait time estimation system described above, the server 100 may wait to receive a signal that an arrival event has occurred and the server may then enable a pedometer counting engine which may be located in pedometer 252. The pedometer 252 may then start counting the number of steps taken by the user until the departure event. The queue estimation system may pull the bits of information from the pedometer device's API or SDK during this time period. The data may be stored in the database/memory 110 or 210 and processed from there as described above.

Many devices today use a combination of accelerometer and pedometer to track step counts. In some instances, only accelerometers are used as they may be more advanced and/or accurate than a pedometer. However, in older devices where accelerometers are not found, the queue estimation system may use pedometer data to calculate wait times. In certain embodiments, both accelerometer data and pedometer data may be used.

Gyroscopes are used to sense orientation and direction of a device, which may be normalized to a polar north. Electronic gyroscopes may operate by sensing angular velocity from the Coriolis force applied to a vibrating element, although the present disclosure is not limited thereto. The various associated angles may be computed by an integrated CPU in the gyroscope 251. Data is collected and stored by the gyroscope device and may be made available via an API and/or SDK from the gyroscope device's codebase.

In terms of the queue estimation system, data/information from the gyroscope 251 may be used by the system or, alternatively, data/information from the gyroscope 251 may be optional. The gyroscope data/information may be used to detect a queue exit event. Upon determining an establishment arrival event, the queue wait time estimation system/process may start the magnetometer 250 and/or the gyroscope 251. The server 100 may obtain data from a user device's codebase via an API and/or SDK and store the obtained data in the database/memory 110 or 210. The obtained data may be processed from there using, e.g., processor 105 or 205. This data may include minute-by-minute device orientation and direction in terms of 360 degrees (which may be normalized by a polar north). In the queue estimation system/process, a determination of a prolonged period of immobile device orientation or direction may be used to detect that a user has left a queue.

Table 1 below presents a non-limiting example of a data set of pedometer and gyroscope data representing a journey of a user during an establishment visit, starting with an arrival event, proceeding to a queue exit event, and ending with a departure event.

TABLE 1

| Time | Steps Taken (From Pedometer) | Device Orientation (From Gyroscope) (x,y,z) | Action Taken |
|---|---|---|---|
| 1:00 pm | 12 | 180,200,−80 | Establishment Arrival Event |
| 1:01 pm | 14 | 185,207,−80 | |
| 1:02 pm | 12 | 172,208,−90 | |
| 1:03 pm | 7 | 173,258,−91 | |
| 1:04 pm | 6 | 170,256,−94 | |
| 1:05 pm | 5 | 182,255,−94 | |
| 1:06 pm | 5 | 182,256,−90 | Queue Exit Event |
| 1:07 pm | 0 | 0,210,−91 | |
| 1:08 pm | 0 | 0,210,−90 | |
| 1:09 pm | 0 | 25,205,−92 | |
| 1:10 pm | 0 | 25,203,−88 | |
| 1:11 pm | 0 | 25,202,−87 | |
| 1:12 pm | 0 | 24,200,−88 | |
| 1:13 pm | 0 | 0,201,−80 | |
| 1:14 pm | 0 | 25,200,−90 | |
| 1:15 pm | 0 | 28,197,−92 | |
| 1:16 pm | 0 | 0,200,−90 | |

TABLE 1-continued

| Time | Steps Taken (From Pedometer) | Device Orientation (From Gyroscope) (x,y,z) | Action Taken |
|---|---|---|---|
| 1:17 pm | 7 | 170,220,−94 | |
| 1:18 pm | 22 | −180,−200,90 | Establishment Departure Event |

Table 1 shows that the entire duration of the stay at the establishment was 18 minutes (from 1:00 pm to 1:18 pm). The queue exit event occurred at 1:06 pm, making this user wait time 6 minutes (1:00 pm to 1:06 pm). The dwelling period (i.e., the time between the queue exit event and the establishment departure event) is 12 minutes (1:06 pm to 1:18 pm).

Considering the example presented in Table 1, the number of steps taken from the pedometer provides a motion pattern of the user's journey. After 1:06 pm, the number of steps taken by the user drops to zero, which indicates that the user is now immobile and therefore has exited the queue. The gyroscope data indicates that after 1:06 pm the orientation of the user's device changes sharply which also indicates that the user has exited the queue. In the first 3 minutes of the user's journey, the y-value of the orientation of the user's device is an average of 205 degrees [(200+207+208)/3]; then suddenly the user's device changes the y-value of orientation to 255 degrees. This change indicates that the user's device has sharply turned orientation/direction, indicating possibly that the user has begun speaking to the service worker (or for any other variety of reasons). The user's y-value orientation remains relatively constant for the next 4 minutes, with an average of approximately 256 [(258+256+255+256)/4] and then the user changes orientation back to 210 degrees. Upon exiting the queue, the x value changes drastically, from an average of approximately 178 degrees [(180+185+172+173+170+182+182)/7] to an average of approximately 42 degrees [0+0+25+25+25+24+0+25+28+0+170+180)/12] for the remainder of the visit. This change in orientation/direction assists in detecting a queue exit event, but is optional in certain embodiments. In certain embodiments, the queue estimation system operates solely on motion data (e.g., pedometer data and/or accelerometer data).

2.3.3 Determining the Estimated Total Quantity of Patrons in an Establishment—Alternative Embodiments Through the use of a dataset containing previously-stored data, the occupancy level (e.g., number of patrons and/or percent of maximum occupancy) of a given establishment can be determined based on data collected and processed. In an embodiment, the occupancy level may be determined by analyzing a dataset (which may be a large dataset) and identifying a time period in which the largest number of patrons are present within the establishment. The largest number of patrons over the given time period may be taken to be the maximum occupancy of the establishment. In an embodiment, the maximum occupancy value may be redetermined and/or changed based on new data added to the dataset (e.g., the maximum occupancy value may be based on the aggregation of new data with old data (or some subset of old data), or the maximum occupancy value may be based on the new data only). Once the maximum occupancy value is determined, a relative occupancy level can be determined for other time periods.

In a non-limiting exemplary embodiment, a dataset is created to include establishment arrival and exit events. In an embodiment, queue exit events are not necessary. This dataset includes the establishment name, location (latitude and longitude), the arrival time of each of a number of patrons, and the departure time of each of those number of patrons. Table 2 below is an exemplary dataset:

TABLE 2

A Coffee Shop
40.090440, -88.246840

| Patron ID | Arrival Time | Departure Time |
|---|---|---|
| 1 | 1:01 | 1:15 |
| 2 | 1:07 | 1:22 |
| 3 | 1:09 | 1:28 |
| 4 | 1:10 | 1:14 |
| 5 | 1:17 | 2:09 |
| 6 | 1:33 | 2:08 |
| 7 | 2:10 | 2:35 |
| 8 | 2:20 | 2:40 |
| 9 | 2:40 | 2:55 |
| 10 | 3:05 | 3:20 |
| 11 | 3:15 | 4:05 |
| 12 | 3:17 | 4:01 |
| 13 | 3:22 | 3:25 |
| 14 | 4:25 | 5:15 |

Using the dataset of Table 2, a number of metrics relating to occupancy can be derived, such as the total number of patrons (occupancy value) for a given time period. Table 3 below presents the occupancy value for discrete time periods of one hour each using the dataset of Table 2:

TABLE 3

| Hour of the Day | Number of Patrons | Which Patrons were Present? |
|---|---|---|
| 1 pm-2 pm | 6 | 1,2,3,4,5,6 |
| 2 pm-3 pm | 5 | 5,6,7,8,9 |
| 3 pm-4 pm | 4 | 10,11,12,13 |
| 4 pm-5 pm | 3 | 11,12,14 |
| 5 pm-6 pm | 1 | 14 |

As seen in Table 3, the hour between 1 μm and 2 pm was the highest occupancy value with 6 patrons in the establishment. This value of 6 may be stored as the establishment's highest occupancy value. In an embodiment, the occupancy value for all other hours of the day may be normalized to this highest occupancy value. For example, the hour between 2 pm and 3 pm (5 patrons) would have a relative occupancy of 83% (5 patrons/6 patrons).

As stated above, the highest occupancy value may be changed since the exemplary system and method may add and/or process new data over time. The highest occupancy value may be changed automatically or manually.

In other embodiments, the queue estimation system may be used to calculate the real-time occupancy and wait-time based on previously stored values. In an embodiment, the real-time occupancy and wait-time may be determined by accessing real-time information from the server 100 and determining the real-time values from the real-time information.

In a non-limiting exemplary embodiment, based on the dataset shown above in Table 2, the highest occupancy value is 6 patrons in the establishment or in a queue for the establishment. In the event where a user views the wait time or occupancy for that establishment from a web or mobile interface, the queue wait time estimation system server 100 receives a signal/ping (which may be the wait time or occupancy request) which causes the server to determine the number of patrons in that establishment at that time (real time occupancy value). In an embodiment, the real time occupancy value is compared to a stored highest occupancy value to determine a relative occupancy value. For example, if the queue wait time estimation system determines that 3 patrons are in an establishment or queue for the establishment when the server is pinged at 5:30 pm, an estimate of the real-time relative occupancy of the establishment of 50% capacity (or 3 current patrons/6 patrons previously stored highest occupancy value) may be returned to the user's device.

In other embodiments, other metrics may be determined from the information stored and/or processed by the server 100. As a non-limiting example, different parts of the time stamps associated with collected and/or stored and/or processed data may be used to calculate dwelling periods. Dwelling periods are particularly valuable information for establishments to understand how consumers behave after being serviced in a queue. As discussed above, a dwelling period is the time between the queue exit event and the establishment departure event. As a non-limited example, assume the following are the time stamps for a user's journey:

Arrival Event: 1:00 pm
Queue Arrival Event: 1:00 pm
Queue Exit Event: 1:05 pm
Departure Event: 1:15 pm In this example, the user's dwell time would be determined to be 10 minutes, or the time spent between the queue exit event (1:05 pm) and the departure event (1:15 pm). Also, in this example, a visitor's entire duration at the establishment would be determined to be 15 minutes, or the time spent between the arrival event and the departure event.

3. Variations

In certain embodiments, the queue wait time estimation system is configured to filter out and ignore queue wait times determined to be unreasonably short or long. For instance, for a particular establishment, the queue wait time estimation system is configured to ignore a queue wait time that is a particular quantity of standard deviations outside of the estimated queue wait time at the point in time the server 100 determined that queue wait time. For example, the estimated queue wait time between 12:00 p.m. and 1:00 p.m. at Restaurant X is 9 minutes with a standard deviation of 2 minutes. If the server 100 determines a queue wait time of 1 minute at 12:30 p.m., the server 100 filters out and ignores that queue wait time (i.e., doesn't use it to update the estimated queue wait time) because that queue wait time is more than 2 standard deviations outside of the 9 minute estimated queue wait time at 12:30 p.m. Any suitable quantity of standard deviations may be used (e.g., 1, 2, or 3 standard deviations).

In some embodiments, the queue wait time estimation system is configured to filter out and ignore queue wait times attributed to those who work at the establishments. For instance, a waiter may enter the establishment and work a 3-hour shift in which the waiter is constantly moving before sitting down for a 15-minute break. In this example, the worker's queue wait time would be 3 hours. The queue wait time estimation system is configured to filter out this unreasonably long queue wait time as described above. In another embodiment, the queue wait time estimation system monitors for sensor data that fluctuates for at least a designated period of time, and ignores any such sensor data.

In various embodiments, the queue wait time estimation system includes one or more notification features. One example notification feature enables the user to input a request to the queue wait time estimation system to notify the user at a particular time to visit a particular establishment. The queue wait time estimation system may notify the user in any suitable manner, such as by causing an image to be displayed on the user device's display device, causing the user device to output an audible alarm, causing an email to be sent to the user's email account, or causing a text message to be sent to the user. For instance, a user may request the queue wait time estimation system to cause the user device to output an alarm and display an image of Restaurant A at 6:30 p.m. to remind the user she has a 7:00 p.m. reservation at Restaurant A.

Another example notification feature enables the user to input a request to the queue wait time estimation system to notify the user when the upper or lower bound estimated queue wait time for a particular establishment falls below a certain threshold. The queue wait time estimation system may notify the user in any suitable manner, such as any of those listed above. For instance, a user may request the queue wait time estimation system to cause the user device to output an alarm and display an image of Restaurant A when the upper bound of the estimated queue wait time for Restaurant A falls below 15 minutes.

Another example notification feature enables the user to input a request to the queue wait time estimation system to notify the user when the estimated total quantity of patrons in a particular establishment falls below a certain threshold. The queue wait time estimation system may notify the user in any suitable manner, such as any of those listed above. For instance, a user may request the queue wait time estimation system to cause the user device to output an alarm and display an image of Gym B when the estimated total quantity of patrons in Gym B falls below 20 patrons.

In certain embodiments, the queue wait time estimation system enables users to order items or services from establishments. For instance, in one example embodiment, the queue wait time estimation system enables users to order food from one or more restaurant establishments for delivery to a desired location or for pick-up at the establishment. In another example embodiment, the queue wait time estimation system enables users to order services such as dry-cleaning services and tailoring services.

In some embodiments in which the user device stores and executes a queue wait time estimation application, the queue wait time estimation application requires the user to agree to enable the queue wait time estimation application to run in the background and wirelessly communicate with—and send the location data to—the server. In certain embodiments, the queue wait time estimation application doesn't require the queue wait time estimation application to run in the background.

The user device described above is a mobile phone, and particularly a smartphone. The user device may be any suitable mobile device configured to wirelessly communicate with the server, such as (but not limited to) a tablet computing device, a personal digital assistant, a wearable computing device (such as a smartwatch), or a laptop computer.

In certain embodiments, the queue wait time estimation system is configured to determine, for a user, a table time via the difference between the queue exit time and the departure time. This is the amount of time the user is sitting at his table. The queue wait time estimation system could determine an estimated table time in a manner similar to that described above.

The queue exit event may be any suitable event that occurs based on data obtained by one sensor or multiple sensors.

In other embodiments, rather than determine the arrival time, the queue exit time, the queue wait time, and the departure time for a particular establishment using data obtained from a user's mobile device, the queue wait time estimation system uses multiple sensors in the establishment to do so. These sensors may be any suitable sensors, such as bi-directional sensors, infrared sensors, RFID sensors, or cameras coupled with body-counting algorithms that enable detection of the direction in which a person is traveling. Sensors placed at the entrance to the establishment and at the end of the queue enable the queue wait time estimation to use the time difference between entrance sensor trips and end-of-queue sensor trips to determine the queue wait time for a user. Integration with point-of-sale systems that enable tracking of transactions can also be used to determine the queue exit time.

In certain embodiments, a user can access and view the establishment data via a queue wait time estimation system website accessible via any suitable computing device (e.g., a desktop computer, a laptop computer, a tablet computing device, a mobile phone, or a wearable computing device). The computing device does not need to send location data or sensor data (and does not even need to be capable of sending this data) to the server of the wait time estimation system to access and display the establishment data via the queue wait time estimation system website. In one such embodiment, the queue wait time estimation system requires a user to have the queue wait time estimation system installed on her user device to access and view the establishment data via the queue wait time estimation system website. For instance, the queue wait time estimation system requires the user to set up a user account (such as by entering a login or user identifier and a password) and install the queue wait time estimation system on her user device. The user can login to the queue wait time estimation system website using the login and password to access and view the establishment data via the website.

In various embodiments, the server can associate different types of establishments with different types of queue exit events that reflect the different natures of the establishments. For instance, in one embodiment, for a particular establishment (such as a dance club), a user may wait in a long, slow-moving line to enter, but after entering may be moving most of the time. In this embodiment, the queue exit event occurs when the following two triggering events occur within a particular time period: (1) the accelerometer data indicates that the user has taken more than a designated quantity of steps within a first designated time period; and (2) the magnetometer data indicates that the direction in which the user device is pointing has changed more than a designated amount within a second designated time period. The particular time period during which the two triggering events must occur for the queue exit event to occur may be any suitable time period. The first and second designated time periods may be of any suitable length, may be the same or different, may completely overlap, may partially overlap, or may not overlap, depending on the embodiment. The designated quantity of steps may be any suitable quantity of steps. For example, the queue exit event occurs when: (1) the accelerometer data indicates the user has taken more than 15 steps within a 60 second time period; and (2) the magnetometer data indicates that the user device 200 has not been pointed within the same a 5 degree range (or any other suitable range) during that same 60 second time period.

In various embodiments, the server can interface with an establishment's point-of-sale terminals to provide real-time (or nearly real-time) data regarding the establishment's queue wait times (or any other suitable metrics). This enables the server to provide various alerts to the point-of-sale terminals, such as when the queue wait time exceeds a particular threshold, to enable the employees to attempt to remedy the situation and reduce the queue wait time to increase customer satisfaction and increase throughput (and therefore profitability).

In certain embodiments, the server is configured to estimate the total quantity of patrons in an establishment that have a particular characteristic, such as a particular favorite sports team or a particular gender. As explained above, as arrival and departure events occur for an establishment, the server increments and decrements the running queue wait time estimation system user count for the establishment. In these embodiments, the server maintains similar counts for users with particular characteristics. For instance, the server increments a Team A fan count for an establishment every time an arrival event occurs for the establishment for a user whose favorite team is Team A and decrements the Team A fan count for the establishment every time a departure event occurs for the establishment for a user whose favorite team is Team A. The server may use a confidence interval population calculation (described above) to account for the fact that not all patrons in the establishment are users of the system and estimate how many patrons in the establishment are fans of Team A. The server may determine a user's characteristics based on the user's profile with the system or a linked social media account to which the user has granted the server access.

In various embodiments, machine-learning and/or Artificial Intelligent (AI) systems can be applied to the queue wait time estimation system. The machine-learning and/or AI systems can assist in detecting the occurrence of a queue exit event with large data sets when there isn't a clear queue exit event, as well as with different types of establishments where the nature of the establishment relies on different rules of sensor movement and orientation to determine a queue exit event. In embodiments where the queue wait time estimation system makes use of very large datasets and/or relies on heavy computational power when operating at-scale, the machine-learning and/or AI systems may be necessary to quickly and accurately process the data in a real-time manner. Additionally, these machine-learning and/or AI-powered systems may be used to predict and/or forecast visit patterns for patrons before or during their visit, which can be useful for business planning for the establishment and/or for patrons planning their trip to an establishment ahead of time.

In certain embodiments the queue wait time estimation system may be a time series analysis, therefore time series specific machine learning models would be preferred. The time series analyses machine-learning models may be supervised models that rely on previous data to learn and make future predictions.

In certain embodiments, the queue wait time estimation system may work in conjunction with a Point-of-Sale (POS) device in an establishment. In certain embodiments, a user's device with the queue wait time estimation system installed may communicate with an establishment's POS to determine the queue arrival time. This may be accomplished by the user's device communicating via a mobile application with the POS.

In other embodiments, the queue wait time estimation system and method can be used in determining how visits to and lengths of stay at one or more locations change in comparison to a baseline or benchmark value determined for that location or for a number of locations.

In an embodiment, the queue wait time estimation system and method may also be used to assess movement and busyness trends over time to compare and/or determine changes in routines for customers, workers, contractors, etc. use or occupancy in a space (e.g., an area, a volume, within a 2-dimensional perimeter, within a 3-dimensional shape, etc., either indoor, outdoor, or some combination of the two) such as, for example, use of a space for a commercial, industrial, entertainment (e.g., theater, park, mall, etc.) and/or other establishment (individually and collectively referred to as "place" and/or "business"). This may be accomplished by establishing benchmarks/baselines, measuring changes over-time, and comparing those changes to the benchmarks/baselines for a particular place and/or, for example, for a particular place and like competitors. One of the data points and/or insights to be gained is to understand the trend of a place's busyness over time, determine competitive information about nearby places, and help planners and responders make informed decisions on cases relating to pandemics. For example, the recent COVID-19 pandemic and social distancing requirements may be set up and monitored.

As discussed in detail above, the queue wait time estimation system and method establishes a means of determining wait times and popularity of places using a variety of sensors in smartphones and other smart-enabled devices. This aggregated data establishes wait time and busyness patterns with historical data and real-time data. This method includes, for example, use of GPS data (and other types of data mentioned above) to determine when users enter and exit a place. This data may be aggregated into large datasets which can be mined and analyzed to not only establish benchmarks but to also determine the mobility of users. Supplemental sensors, as discussed above, are also used to increase the accuracy of enter and exit events from a place. In an embodiment, data points from multiple users may be stored in a database for later access and analysis to establish benchmarks and deltas (e.g., mobility).

In a non-limiting exemplary embodiment, Table 4 below shows the entrance and exit events of a single user that are stored in a database for later processing.

TABLE 4

| Event | Time of Event |
| --- | --- |
| User 1 entered restaurant | 1:00 pm |
| User 1 exited restaurant | 1:07 pm |

The above data indicate a single event of a restaurant visit by a single user. Table 5 indicates a non-limiting example of how a database can store the number of daily restaurant visits (for three days in this example) for later processing as a benchmark/baseline and/or for measuring deltas (i.e., deviations) from the baseline.

TABLE 5

| Date | Number of Visits |
| --- | --- |
| Mar. 1, 2020 | 30 |
| Mar. 2, 2020 | 35 |
| Mar. 3, 2020 | 32 |
| Average | 32.33 |
| Median | 32 |

The example data shown in Table 5 may be used to establish a benchmark using averages, medians, etc. The implications of this data help determine, for example, average visits and number of wait times within a distribution over time. This data can be referred to and/or updated or refined over time to determine, for example, changes in time of and duration of visits and number of wait times to thereby help owners/managers determine average on-site time for their business and, for example, allowing for more informed forecasting decisions. Additionally, this data can be used on a larger scale to assist in analyzing global issues such as quantifying the impact of social distancing efforts during global pandemics such as the recent COVID-19.

Determining a benchmark is important for multiple reasons. For one, it allows businesses to better forecast future visits and wait times. It can also be used to later compare the trend of business in terms of visits and wait times and help optimize operations. Determining a benchmark can be done a number of ways. One exemplary method includes choosing a range of dates and analyzing the statistical averages for that date range. Another exemplary way of determining benchmarks is through a quantity of the numbers.

For example, a chosen date range can be analyzed using a statistical average to quantify a benchmark. In Table 6 below, data for ten dates at a place is shown indicating a total number of visits per day and a total number of those visits having a wait time under five minutes.

TABLE 6

| Date | Number of Visits | Number of Visits Under Five Minute Wait Time |
| --- | --- | --- |
| Mar. 1, 2020 | 30 | 4 |
| Mar. 2, 2020 | 35 | 3 |
| Mar. 3, 2020 | 32 | 4 |
| Mar. 4, 2020 | 20 | 6 |
| Mar. 5, 2020 | 22 | 5 |
| Mar. 6, 2020 | 30 | 2 |
| Mar. 7, 2020 | 28 | 3 |
| Mar. 8, 2020 | 24 | 5 |
| Mar. 9, 2020 | 22 | 6 |
| Mar. 10, 2020 | 34 | 6 |
| Mean | 27.7 | 4.4 |
| Median | 29 | 4.5 |
| Mode | 30 | 6 |

According to the sample data in Table 6, a mean benchmark is established for the date range of March 1 through March 10 of 27.7 total visits and 4.4 visits with wait times under five minutes. Also established is a median of 29 and 4.5, respectively; and a mode of 30 and 6, respectively. Another exemplary, non-limiting method for determining a benchmark entails the use of a summation of daily visits to determine the number of days that pass before reaching a desired value of visits.

Referring to Table 7 below, an example of a summation of daily visits is presented.

TABLE 7

| Date | Number of New Visits | Cumulative Number of Visits |
| --- | --- | --- |
| Mar. 1, 2020 | 30 | 30 |
| Mar. 2, 2020 | 45 | 75 |
| Mar. 3, 2020 | 25 | 100 |
| Mar. 4, 2020 | 50 | 150 |
| Mar. 5, 2020 | 40 | 190 |

As shown in Table 7, to reach a cumulative number of visits equaling 100, three days would be required (March 1 to March 3). The three day time span to reach 100 cumulative visits may, for the purposes of this example, be set as a benchmark. This benchmark can be used for a number of purposes, such as managing inventory. For example, if each visit results in the sale or consumption of one widget sold by the business, the business' managers will know that, on average, they will need to stock approximately 233 widgets every week (7 days×33.33 widgets/day).

In a similar manner, GPS and sensor data collected from users/customers may be used to determine benchmarks over time using the queue wait time estimation system and methodology. Using benchmarks, for example, allows for gauging business performance, place occupancy, etc. Additionally, a change (i.e., a delta) from a benchmark value can be determined over time to measure trends compared to the established benchmark and/or to refine a benchmark (e.g., there can be a number of benchmarks based on, for example, day of the week, the month, the season, the weather, coincidence with local events, etc.)

Measuring changes/deltas can be accomplished using the same underlying technology as establishing a benchmark, e.g., selecting a new date range to compare to a measured attribute to the established benchmark. Comparison of these changes with a benchmark allows for an understanding of trends in visits and wait times over time, for example. While this information is useful to a business by allowing for more informed decisions about operations, on a larger scale, these changes can also help with measuring changes in categories of places (such as restaurant visits vs staying home) to help measure the effectiveness of policies such as social distancing during global pandemics.

Table 8 below shows information that may be used to determine a benchmark for number of visits and number of visits under a five minute duration for the time frame of March 1 to March 10.

TABLE 8

| Date | Number of Visits | Number of Visits Under Five Minute Wait Time |
| --- | --- | --- |
| Mar. 1, 2020 | 30 | 4 |
| Mar. 2, 2020 | 35 | 3 |
| Mar. 3, 2020 | 32 | 4 |
| Mar. 4, 2020 | 20 | 6 |
| Mar. 5, 2020 | 22 | 5 |
| Mar. 6, 2020 | 30 | 2 |
| Mar. 7, 2020 | 28 | 3 |
| Mar. 8, 2020 | 24 | 5 |
| Mar. 9, 2020 | 22 | 6 |
| Mar. 10, 2020 | 34 | 6 |
| Mean | 27.7 | 4.4 |
| Median | 29 | 4.5 |
| Mode | 30 | 6 |

For the purposes of this example, the benchmark for number of visits and number of visits under a five minute duration will each be set to the median value shown in Table 8, i.e., 29 visits per day and 4.5 visits under a five minute duration for the time frame of March 1 to March 10.

Table 9 below shows similar information for the time frame of March 11 to March 20.

TABLE 9

| Date | Number of Visits | Number of Visits Under Five Minute Wait Time |
| --- | --- | --- |
| Mar. 11, 2020 | 31 | 5 |
| Mar. 12, 2020 | 40 | 6 |

TABLE 9-continued

| Date | Number of Visits | Number of Visits Under Five Minute Wait Time |
|---|---|---|
| Mar. 13, 2020 | 33 | 7 |
| Mar. 14, 2020 | 24 | 7 |
| Mar. 15, 2020 | 20 | 8 |
| Mar. 16, 2020 | 35 | 9 |
| Mar. 17, 2020 | 36 | 3 |
| Mar. 18, 2020 | 30 | 2 |
| Mar. 19, 2020 | 21 | 1 |
| Mar. 20, 2020 | 40 | 4 |
| Mean | 31 | 5.2 |
| Median | 32 | 5.5 |
| Mode | 40 | 7 |

For the purposes of this example, the benchmark for number of visits and number of visits under a five minute duration will each be set to the median value shown in Table 9, i.e., 32 visits per day and 5.5 visits under a five minute duration for the time frame of March 11 to March 20.

A comparison of the benchmarks (median values in this example) from Tables 8 and 9 can be compared to determine the delta/changes from one time frame to the other. For example, the overall change in median visit value and number of wait times under five minutes from March 1-10 to March 11-20 was an increase of 10.3% in patron visits (32÷29−1) and an increase of 22.2% in the number of visits that had a five minute or less wait time. (5.5÷4.5−1). Therefore, while there were 10.3% more visits from March 11-20 compared to March 1-10, the number of visits with short (less than five minutes) wait time also increased by 22.2%. Using this data, businesses can be more prepared for future operations.

Referring now to Table 10, and applying the benchmark information from Table 8, for the time frame of March 11-20 the percent changes for each day from the Table 8 benchmark values is shown.

TABLE 10

| Date | Number of Visits | Percent Change from Benchmark | Number of Visits Under Five Minute Wait Time | Percent Change from Benchmark |
|---|---|---|---|---|
| Mar. 11, 2020 | 31 | 6.90 | 5 | 11.11 |
| Mar. 12, 2020 | 40 | 37.93 | 6 | 33.33 |
| Mar. 13, 2020 | 33 | 13.79 | 7 | 55.56 |
| Mar. 14, 2020 | 24 | −17.24 | 7 | 55.56 |
| Mar. 15, 2020 | 20 | −31.03 | 8 | 77.78 |
| Mar. 16, 2020 | 35 | 20.69 | 9 | 100.00 |
| Mar. 17, 2020 | 36 | 24.14 | 3 | −33.33 |
| Mar. 18, 2020 | 30 | 3.45 | 2 | −55.56 |
| Mar. 19, 2020 | 21 | −27.59 | 1 | −77.78 |
| Mar. 20, 2020 | 40 | 37.93 | 4 | −11.11 |

The data in Table 10 may be used to compare deltas from the benchmark value day by day. On a larger scale, this daily information may be used to measure changes in visits to restricted places to measure the effectiveness of social distancing policies during global pandemics.

In addition to determining these values for individual places, the data from individual places may be aggregated for analysis across broader categories of places, e.g., restaurants, stores, parks, residential areas, within township/city/state borders, etc., as discussed below. This information may also be used to analyzed across subcategories, e.g., departments of a store, stores within a mall, occupancy on a floor within a building, etc.

In an embodiment, the queue wait time estimation system and method may use data from individual places and aggregate that data across a given category to determine, among other things, trends for similar businesses, user density within a given area, etc. In one embodiment, knowledge of the number of users/customers at a given point in time combined with floor space may allow for a calculation of whether social distancing regulations are being adhered to.

Determining how the number of visits and lengths of stay at various places change compared to a baseline/benchmark allows for a comparison across broader categories of places. Table 11 presents exemplary data for individual coffee shops over a given time frame (e.g., March 1-10).

TABLE 11

| Coffee Shop | Benchmark Daily Visits | Benchmark Daily Visits With More Than Five Minutes Wait Time |
|---|---|---|
| 1 | 30 | 5 |
| 2 | 35 | 8 |
| 3 | 34 | 8 |
| 4 | 60 | 6 |
| 5 | 40 | 4 |
| Category Benchmark | 39.8 | 6.2 |

As shown in Table 11, the determined category benchmark for coffee shop daily visits between March 1-10 is 39.8. Additionally, the determined category benchmark for coffee shop daily visits having a wait time duration of more than five minutes is 6.2.

The logic of comparing changes to a benchmark can be applied to this data to establish category changes over time. This information may be used, for example, to compare how industries are growing or shrinking. This information may also be used, for example, to compare industries to each other. For example, the number of visits per month to coffee shops can be compared to the number of visits per month to restaurants, airports, parks, etc. Additionally, as determined by the queue wait time estimation system and method using GPS and other sensor data described above, the number of visits values may be compared with values representing people at their home address so that a determination may be made regarding how many people are staying home versus going to coffee shops or airports.

Table 12 presents exemplary data regarding a comparison of category benchmarks for daily visits for various places for the time frame March 1-10.

TABLE 12

| Category | Category Benchmark for Daily Visits March 1-10 | Category Benchmark For Daily Visits With More Than Five Minutes Wait Time March 1-10 |
|---|---|---|
| Coffee Shops | 39.8 | 6.2 |
| Restaurants | 40.6 | 10.4 |
| Airports | 105.3 | 50 |
| Parks | 80.5 | N/A |
| Home Address | 2.5 | N/A |

Table 13 presents similar exemplary data but for the time frame of March 11-20.

TABLE 13

| Category | Category Benchmark for Daily Visits March 1-10 | Category Benchmark for Daily Visits March 11-20 | Category Benchmark For Daily Visits With More Than Five Minutes Wait Time March 1-10 | Category Benchmark For Daily Visits With More Than Five Minutes Wait Time March 11-20 |
|---|---|---|---|---|
| Coffee Shops | 39.8 | 40.4 | 6.2 | 5.8 |
| Restaurants | 40.6 | 41.2 | 10.4 | 10.9 |
| Airports | 105.3 | 90.8 | 50 | 60 |
| Parks | 80.5 | 77.3 | N/A | N/A |
| Home Address | 2.5 | 1.75 | N/A | N/A |

Table 14 presents the percent change in the category benchmarks from time frame March 1-10 to time frame March 11-20 for the information in Table 13.

TABLE 14

| Category | Percent Change for Daily Visits | Percent Change for Daily Visits With More Than Five Minutes Wait Time |
|---|---|---|
| Coffee Shops | 1.51 | −6.45 |
| Restaurants | 1.48 | 4.81 |
| Airports | −13.77 | 20.00 |
| Parks | −3.98 | N/A |
| Home Address | −30.00 | N/A |

In the example presented above, the percent change in category benchmarks for various places indicates that in the time frame of March 11-20 there were 13.77% less visits at airports (compared to airport visits from the time frame March 1-10), but 1.51% more visits at coffee shops.

One of the implications of this data from the queue wait time estimation system and method is to allow for measuring the performance of various broad categories of places' daily visits and their wait times (if applicable). This information may be used to measure the performance of the economy as a whole or for determining whether (when and/or where) to invest in a new business and/or industry. Additionally, this information may be used to measure the effectiveness of a social distancing policy for global pandemics such as COVID-19.

In other embodiments, the queue wait time estimation system and method may be used to determine the distance between users/customers in a queue, while dining, or engaged in some other activity. The queue wait time estimation system and method may utilize inputs from a number of different sensors, including Bluetooth technology. These sensors are pertinent in that they can assist in detecting immobility and distance between patrons, and eventually lead to the detection of a queue exit event.

Bluetooth technology is commonly found in most smart phones and other mobile and/or internet connected devices. For use with the queue wait time estimation system and method, Bluetooth-enabled devices may act as beacons to measure the distance between devices. This may also be used as a supplemental method in determining the accuracy of wait-times and dwelling-times at various locations. Using Bluetooth technology, the queue wait time estimation system and method has the capability to determine the distance and position of various devices in a queue and/or area and may be used to predict a queue exit event.

In an exemplary, non-limiting embodiment, a first Bluetooth device D1 emits a signal (Ping1) to determine if other Bluetooth enabled devices are nearby. Ping1 includes a unique identifier (e.g., an ID number) associated with D1. A second Bluetooth device D2 receives Ping1 from D1 and D2 emits its own ping (Ping2—which includes a unique identifier for D2) which is received by D1. A connection is thus establishing between D1 and D2. D1 (and/or D2) can measure the time from emitting its respective ping to the time when it receives a ping from another Bluetooth enabled device. A distance between the two Bluetooth enabled devices can be determined from this time difference. Alternatively, the distance between two Bluetooth enabled devices may be determined from a received signal strength of a ping. The measured and/or determined values (e.g., time, signal strength, distance, etc.) may be stored in a database with a time stamp and may be used to determine a change in distance over time between two Bluetooth enabled devices. This change, either taken alone or in combination with other sensor information from the queue wait time estimation system and method may be used to indicate compliance with social distancing policies, entrance to a queue, exit from a queue, or other indicia.

In an embodiment, a method of operating a queue wait time estimation system is described, the method comprising the steps of establishing wireless communication with a user device located within a predetermined first space; receiving, by a network interface and from the user device, location data associated with the user device; monitoring, by a processor, the location data for an occurrence of an arrival event associated with the predetermined first space; responsive to an occurrence of the arrival event: storing, in a memory device, an arrival time; monitoring, by the processor, the location data for an occurrence of a departure event associated with the predetermined first space; receiving, from the user device via the network interface, sensor data determined based on feedback from at least one sensor of the user device; monitoring, by the processor, the sensor data for an occurrence of a queue exit event; responsive to an occurrence of the queue exit event, storing, in the memory device, a queue exit time; and responsive to an occurrence of the departure event, storing, in the memory device, a departure time; determining, by the processor, based at least in part on the arrival time, a value V1 representative of a number of visits to the predetermined first space for a predetermined first time frame; and comparing V1 with a predetermined value V2 representative of a baseline number of visits for a predetermined second time frame.

In a further embodiment, V2 represents a baseline number of visits to the predetermined first space for the predetermined second time frame. In a further embodiment, V2 represents a baseline number of visits to a predetermined first set of spaces for the predetermined second time frame. In a further embodiment, the predetermined first set of spaces includes the predetermined first space.

A further embodiment includes the step of evaluating an effectiveness of a social distancing policy based on the comparison of V1 and V2. A further embodiment includes determining, by the processor, a queue wait time based on at least the arrival time and queue exit time. A further embodiment includes determining, by the processor and based in part on the queue wait time, data including an estimated queue wait time for the predetermined first space.

In a further embodiment, the sensor data is selected from the group consisting of: GPS data, pedometer data, gyroscope data, and combinations thereof.

A further embodiment includes comparing V1 with a value V3 representative of a number of visits to a predetermined set of second spaces for the predetermined first time frame. In a further embodiment, the predetermined set of second spaces includes a home for a use associated with the user device.

In an embodiment, a queue wait time estimation system comprise a processor; a network interface; and a memory device that stores instructions that, when executed by the processor, cause the processor to: establish wireless communication with a user device located within a predetermined first space; receive, by the network interface and from the user device, location data associated with the user device; monitor, by the processor, the location data for an occurrence of an arrival event associated with the predetermined first space; responsive to an occurrence of the arrival event: store, in the memory device, an arrival time; monitor, by the processor, the location data for an occurrence of a departure event associated with the predetermined first space; receive, from the user device via the network interface, sensor data determined based on feedback from at least one sensor of the user device; monitor, by the processor, the sensor data for an occurrence of a queue exit event; responsive to an occurrence of the queue exit event, store, in the memory device, a queue exit time; and responsive to an occurrence of the departure event, store, in the memory device, a departure time; determine, by the processor, based at least in part on the arrival time, a value V1 representative of a number of visits to the predetermined first space for a predetermined first time frame; and compare V1 with a predetermined value V2 representative of a baseline number of visits for a predetermined second time frame.

In a further embodiment, V2 represents a baseline number of visits to the predetermined first space for the predetermined second time frame. In a further embodiment, V2 represents a baseline number of visits to a predetermined first set of spaces for the predetermined second time frame. In a further embodiment, the predetermined first set of spaces includes the predetermined first space.

In a further embodiment, the processor further executes instructions to evaluate an effectiveness of a social distancing policy based on the comparison of V1 and V2.

In a further embodiment, the processor further executes instructions to determine, by the processor, a queue wait time based on at least the arrival time and queue exit time. In a further embodiment, the processor further executes instructions to determine, by the processor and based in part on the queue wait time, data including an estimated queue wait time for the predetermined first space.

In a further embodiment, the sensor data is selected from the group consisting of: GPS data, pedometer data, gyroscope data, and combinations thereof.

In a further embodiment, the processor further executes instructions to compare V1 with a value V3 representative of a number of visits to a predetermined set of second spaces for the predetermined first time frame.

In a further embodiment, the predetermined set of second spaces includes a home for a use associated with the user device.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of operating a queue wait time estimation system, the method comprising:
   establishing wireless communication with a user device located within a predetermined first space;
   receiving, by a network interface and from the user device, location data associated with the user device;
   monitoring, by a processor, the location data for an occurrence of an arrival event associated with the predetermined first space; responsive to an occurrence of the arrival event:
   storing, in a memory device, an arrival time; monitoring, by the processor, the location data for an occurrence of a departure event associated with the predetermined first space;
   receiving, from the user device via the network interface, sensor data determined based on feedback from at least one sensor of the user device;
   monitoring, by the processor, the sensor data for an occurrence of a queue exit event;
   responsive to an occurrence of the queue exit event, storing, in the memory device, a queue exit time; and
   responsive to an occurrence of the departure event, storing, in the memory device, a departure time;
   determining, by the processor, based at least in part on the arrival time, a value V1 representative of a number of visits to the predetermined first space for a predetermined first time frame; and
   comparing VI with a predetermined value V2 representative of a baseline number of visits for a predetermined second time frame;
   further comprising the step of evaluating an effectiveness of a social distancing policy based on the comparison of VI and V2;
   determining, by the processor, a queue wait time based on at least the arrival time and queue exit time and based in part on the queue wait time, data including an estimated queue wait time for the predetermined first space.

2. The method of claim 1, wherein V2 represents a baseline number of visits to the predetermined first space for the predetermined second time frame.

3. The method of claim 1, wherein V2 represents a baseline number of visits to a predetermined first set of spaces for the predetermined second time frame.

4. The method of claim 3 wherein the predetermined first set of spaces includes the predetermined first space.

5. The method of claim 1, wherein the sensor data is selected from the group consisting of: GPS data, pedometer data, gyroscope data, and combinations thereof.

6. The method of claim 1, further comprising the step of comparing V1 with a value V3 representative of a number of visits to a predetermined set of second spaces for the predetermined first time frame.

7. The method of claim 6, wherein the predetermined set of second spaces includes a home for a use associated with the user device.

8. A queue wait time estimation system comprising:
   a processor;
   a network interface; and
   a memory device that stores instructions that, when executed by the processor, cause the processor to:
   establish wireless communication with a user device located within a predetermined first space;
   receive, by the network interface and from the user device, location data associated with the user device;

monitor, by the processor, the location data for an occurrence of an arrival event associated with the predetermined first space; responsive to an occurrence of the arrival event:

store, in the memory device, an arrival time; monitor, by the processor, the location data for an occurrence of a departure event associated with the predetermined first space;

receive, from the user device via the network interface, sensor data determined based on feedback from at least one sensor of the user device;

monitor, by the processor, the sensor data for an occurrence of a queue exit event;

responsive to an occurrence of the queue exit event, store, in the memory device, a queue exit time; and responsive to an occurrence of the departure event, store, in the memory device, a departure time;

determine, by the processor, based at least in part on the arrival time, a value VI representative of a number of visits to the predetermined first, space for a predetermined first time frame; and compare VI with a predetermined value V2 representative of a baseline number of visits for a predetermined second time frame, wherein the processor further executes instructions to evaluate an effectiveness of a social distancing policy based on the comparison of VI and V2, executes instructions to determine, by the processor, a queue wait time based on at least the arrival time and queue exit time and based in part on the queue wait time, data including an estimated queue wait time for the predetermined first space.

9. The system of claim 8, wherein V2 represents a baseline number of visits to the predetermined first space for the predetermined second time frame.

10. The system of claim 8, wherein V2 represents a baseline number of visits to a predetermined first set of spaces for the predetermined second time frame.

11. The system of claim 10 wherein the predetermined first set of spaces includes the predetermined first space.

12. The system of claim 8, wherein the sensor data is selected from the group consisting of: GPS data, pedometer data, gyroscope data, and combinations thereof.

13. The system of claim 8, wherein the processor further executes instructions to compare V1 with a value V3 representative of a number of visits to a predetermined set of second spaces for the predetermined first time frame.

14. The system of claim 13, wherein the predetermined set of second spaces includes a home for a use associated with the user device.

* * * * *